US007707003B2

(12) United States Patent
O'Connor et al.

(10) Patent No.: US 7,707,003 B2
(45) Date of Patent: Apr. 27, 2010

(54) METHOD AND APPARATUS FOR TRACING AND BLENDING COMMINGLED NON-LIQUID BULK MATERIALS

(75) Inventors: Timothy C. O'Connor, Lafayette, CO (US); Guy A. Fromme, Louisville, CO (US)

(73) Assignee: Bin Tech L.L.L.P. CO (US)

( * ) Notice: Subject to any disclaimer, the term of this patent is extended or adjusted under 35 U.S.C. 154(b) by 216 days.

(21) Appl. No.: 11/816,737

(22) PCT Filed: Feb. 23, 2006

(86) PCT No.: PCT/US2006/006156

§ 371 (c)(1), (2), (4) Date: Aug. 21, 2007

(87) PCT Pub. No.: WO2006/091615

PCT Pub. Date: Aug. 31, 2006

(65) Prior Publication Data

US 2008/0156124 A1 Jul. 3, 2008

Related U.S. Application Data

(60) Provisional application No. 60/593,904, filed on Feb. 23, 2005.

(51) Int. Cl.
*G01C 19/00* (2006.01)

(52) U.S. Cl. ........................ 702/150; 73/861.73; 353/5; 356/2; 356/300; 356/306; 702/179; 705/500

(58) Field of Classification Search ................. 702/150, 702/152, 155, 166–167, 179; 353/5; 356/2, 356/300, 306; 705/500; 73/861.73
See application file for complete search history.

(56) References Cited

U.S. PATENT DOCUMENTS 4,034,339 A 7/1977 Free et al.

(Continued)

FOREIGN PATENT DOCUMENTS

WO 01/99018 A1 12/2001

OTHER PUBLICATIONS

Kaestner et al., "Identifying the Interface between Two Sand Materials," Proceedings of the Fifth International Conference on 3-D Digital Imaging and Modeling, 2005, pp. 410-415, IEEE Computer Society, Washington, DC USA.

(Continued)

*Primary Examiner*—Eliseo Ramos Feliciano
*Assistant Examiner*—Elias Desta
(74) *Attorney, Agent, or Firm*—Holland & Hart LLP

(57) ABSTRACT

A method and system collects and manipulates information from various sources for the purpose of determining the location of loads of material in a bulk material storage container and tracing the number and identity of bulk material sources, such as farms or processing plants, for loads located within a bulk material storage container. Such production source information is thus uniquely associated with a particular non-liquid bulk material load. Surface mapping of a surface of bulk material stored in a storage container is performed before and after material is added to the container, and are used to determine position of loads within the storage container. Embodiments of the present invention, using knowledge of the position of loads within the container, may be used for the purposes of preplanning and enhancing blended load-out batches.

24 Claims, 21 Drawing Sheets

U.S. PATENT DOCUMENTS

| | | | | | |
|---|---|---|---|---|---|
| 4,582,992 | A | * | 4/1986 | Atwell et al. | 250/359.1 |
| 4,882,927 | A | | 11/1989 | Gould | |
| 5,190,165 | A | | 3/1993 | Garfield, Jr. | |
| 5,337,289 | A | | 8/1994 | Fasching et al. | |
| 5,465,847 | A | | 11/1995 | Gilmore | |
| 5,959,218 | A | * | 9/1999 | Strubbe | 73/861.73 |
| 5,978,771 | A | | 11/1999 | Vandivier | |
| 5,983,198 | A | | 11/1999 | Mowery et al. | |
| 6,148,291 | A | | 11/2000 | Radican | |
| 6,508,615 | B2 | | 1/2003 | Taylor | |
| 6,847,305 | B1 | | 1/2005 | Buck | |
| 2002/0116299 | A1 | | 8/2002 | Diamond et al. | |
| 2003/0093178 | A1 | | 5/2003 | Russell et al. | |
| 2003/0110068 | A1 | | 6/2003 | Matheson et al. | |
| 2004/0024658 | A1 | | 2/2004 | Carbone et al. | |
| 2004/0031335 | A1 | | 2/2004 | Fromme et al. | |
| 2004/0117294 | A1 | | 6/2004 | Ferraro et al. | |

OTHER PUBLICATIONS

International Search Report and the Written Opinion of the International Searching Authority for corresponding Patent Application No. PCT/US2006/006156.

* cited by examiner

METHOD AND APPARATUS FOR TRACING AND BLENDING COMMINGLED NON-LIQUID BULK MATERIALS

CROSS REFERENCE TO RELATED APPLICATIONS

This application claims priority from the U.S. provisional application No. 60/593,904 filed Feb. 23, 2005, the entire disclosure of which is incorporated herein by reference.

FIELD OF INVENTION

The present invention relates to methods for tracking/tracing and enhanced blend planning of commingled non-liquid powder and granular bulk materials stored in silos, other large containers and/or on the ground.

BACKGROUND OF THE INVENTION

Many materials, including many commodities, are collected from numerous sources and transported to a central location or facility that may provide temporary storage before transport to another location, or that may process the material directly. Such materials include, for example, grain, grain products, animal feed, sugar, coffee, milk powders, salt, mineral ores, precious ores, and coal products, to name but a few. These materials are commonly referred to as bulk materials, or bulks, and are transported from the sources using any of a number of transport methods, such as, for example, trucks, wagons, rail cars, and ships. Whatever the method of transport, the amount of material that may be transported in a vehicle is generally referred to as a load.

Commingled storage of both liquid and non-liquid bulks is practiced worldwide because the materials are generally considered homogeneous and storage in large holding containers is in many instances the most economical method. As will be recognized, liquid bulk materials mix together when they are commingled, resulting in a liquid mixture that is generally homogeneous, and thus such bulks are generally assumed to be homogeneous. However it is not valid to assume homogeneity for non-liquid or so called dry bulks. Such dry type granular and powder bulks actually layer when added into storage. Also, the non-liquid aspect of granular bulk materials effectively prevents the self-leveling and mixing that is typically seen when storing or transporting liquid bulks. With no self-leveling, stored dry bulks also develop complex surface shapes which make accurate inventory measurement difficult.

FIG. 1 depicts a typical bulk handling facility and process. Here the practice is shown where loads of the bulk are added and stored together at the storage container and shows how bulks are typically withdrawn from the containers. The inbound and outbound diagrams depict the limits of knowledge according to current art regarding the disposition of multiple individual bulk loads stored in any particular container: this disposition is either 1.) unknown (black shading) with only a rough level measurement to indicate gross fill level or 2.) it is unknown with only an undifferentiated cross section (using state of the art surface mapping technology) available to indicate the exact fill level.

As mentioned above, the bulk material in such a facility may originate from numerous different sources, such as individual farms, separate batches or lots, or different mines. Once bulk material is commingled at bulk handling facilities, it becomes increasingly difficult to determine the source of the material. For example, one bin may receive fifty truckloads of material from fifty different sources. When material is removed from the bin, the source of the material is not generally known beyond being from among the total number of sources that were associated with each load added to the bin.

Also, at present it is generally assumed that all of the material properties, such as bulk density, for example, within the storage container or pile is homogeneous or an average of all loads previously added. Such material properties are commonly utilized when attempting to withdraw material from one or more storage containers with the intent of meeting a particular set of final load specifications. For example, an entity may desire to generate a load having a specified material property target by blending material from two storage containers with the material from the first container having a material property that exceeds the specified property target, and the material from the second container having a material property that is below the specified property target. In such a manner, the combined final load may have a higher monetary value as compared to the value of the material from the containers would have individually. However, in many instances such an assumption is erroneous because the inventory stored inside the container is actually made up of multiple layered strata of material with varying material properties (i.e. moisture content, protein content, sulfur content etc.). In the absence of a better method, batch plans are estimated for the final load from the averages data. During load-out, the accumulating batch is continuously sampled to check the actual content versus the intended content to meet the specification. Furthermore, the load-out rates/quantities are adjusted at the source discharge point with the intent of trying to adjust the blend to meet the intended specification. When the required specification is not met, the operator either attempts to re-blend to meet the specification or pays a penalty to his downstream customer (if allowed) for deviation from the specification. Blending is currently considered somewhat of an art form requiring experienced operators.

SUMMARY OF THE INVENTION

The present invention provides a system and method for determining and tracking locations of loads of bulk material stored in one or more bulk material storage containers. Various embodiments of the present invention provide the ability to trace one or more loads of bulk material through one or more bulk material handling facilities. Other embodiments of the present invention provide for determining volumes or masses of bulk material to withdraw from one or more bulk material storage containers to be blended to achieve a desired output specification.

In one aspect, the invention provides a method for determining the location of each of multiple loads of commingled non-liquid bulk material in a storage container comprising: (a) obtaining a first surface map of an upper surface of existing bulk material stored in a bulk material storage container; (b) recording properties and identification information associated with loads of bulk material added to the bulk material storage container, including at least a first load of bulk material added to the bulk material storage container; (c) obtaining a second surface map of the upper surface of bulk material stored in the bulk material storage container, the second surface map obtained after the first surface map and after at least the first load of bulk material is added to the bulk material storage container; and (d) arranging the properties and identification information to indicate actual sequential layering of each of the loads of bulk material added to the bulk material storage container. A volume of the first load within the bulk material storage container may be determined based on a difference between the first surface map and the second surface map, and based on the properties and identification of the loads of bulk material added to the container.

In another embodiment, properties and identification information are recorded that are associated with a second load of bulk material added to the bulk material storage container, the second load added after the first load, with the second surface map obtained after the second load of bulk material is added to the bulk material storage container. A volume of each of the first and second loads within the bulk material storage container may be determined based on a difference between the first surface map and the second surface map, and based on the properties and identification of the loads of bulk material added to the bulk material storage container.

The step of recording may comprise recording a source associated with the first load of bulk material and recording measured properties that characterize the bulk material, the properties including at least one of: bulk type, species, water content, protein content, foreign material content, defect content and impurity content. The step of recording may also include processing the properties and identifying information to provide a record of sources associated with all incoming bulk material loads handled through the bulk material storage container. Records of sources and the properties and identifying information associated with each bulk material load may be exchanged with at least one other bulk material storage container that received at least a portion of bulk material withdrawn from the bulk material storage container, thus enabling tracing bulk material sources associated with all loads that are stored at the bulk material storage containers. Such bulk material storage containers may include all bulk material storage containers located at one or more transshipment facilities owned by a corporation and/or all bulk material storage and transshipment facilities monitored by a government regulatory agency.

In another aspect, the invention provides a method for determining the source(s) of each of multiple loads of commingled non-liquid bulk material withdrawn from a storage container comprising: (a) obtaining a first surface map of an upper surface of bulk material stored in a bulk material storage container; (b) obtaining stored load information associated with stored loads of bulk material stored at the bulk material storage container, the load information including properties and identification information for the stored loads and sequential layering information of the stored loads; (c) obtaining a second surface map of the upper surface of bulk material stored in the bulk material storage container, the second surface map obtained after the first surface map and after a first load of bulk material is withdrawn from the bulk material storage container; and (d) identifying, based on the stored load information, identification information for each stored load that comprises at least a portion of the first load. A volume within the bulk material storage container of each of the stored loads may be determined, along with, for each stored load identified in the step of identifying, a volume of the stored load contained in the first load. Properties and identification information may be recorded that are associated with at least a second load of bulk material added to the bulk material storage container, the second load added after the first load is withdrawn; a third surface map obtained of the upper surface of bulk material stored in the bulk material storage container, the third surface map obtained after the second load of bulk material is added to bulk material storage container; and the properties and identification information arranged to indicate actual sequential layering of the second load and any stored loads of bulk material remaining after the first load is withdrawn. In one embodiment, the properties characterize the bulk material and include at least one of: bulk type, species, water content, protein content, foreign material content, defect content and impurity content.

Still another aspect of the invention provides a method for determining input volumes or masses from one or more containers holding one or more sources of non-liquid bulk material to obtain an output meeting a target output specification, comprising: (a) obtaining first container load information associated with stored loads of bulk material stored at a first bulk material storage container, the load information including properties and identification information for the stored loads and sequential layering information of the stored loads at the first bulk material storage container; (b) obtaining load information associated with stored loads of bulk material stored at one or more additional bulk material storage containers, the load information including properties and identification information for the stored loads and sequential layering information of the stored loads at respective bulk material storage containers; (c) obtaining a target specification of at least one property of an output load; (d) calculating a volume or mass of bulk material to be withdrawn from the first container and the one or more additional containers to achieve the target specification, the calculating based on the first container load information and load information of the one or more additional containers. The step of calculating may comprise calculating a rate of removal, and a duration of removal at the rate, for each container to achieve a blended load that meets the target specification. Furthermore, the first container may contain a first load of bulk material that meets the target specification, the step of calculating comprising calculating a volume or mass of bulk material to be withdrawn from the first container to withdraw the first load.

In still another aspect, the invention provides a system for locating and tracking loads of commingled non-liquid bulk material added/withdrawn to/from bulk material storage container(s), comprising: (a) a mapping unit operable to receive surface data indicative of a surface of bulk material stored at one or more bulk material storage container(s); (b) a database operable to store properties and identification information associated with loads of bulk material added to and removed from the bulk material storage container(s) and operable to store a sequence in which the loads were added and removed; and (c) a processor operable to determine a location of one or more loads of bulk material within at least a first bulk material storage container based on the surface data, the sequence information, and the properties and identification of the loads of bulk material stored at the first bulk material storage container.

DETAILED DESCRIPTION

Figure 1:
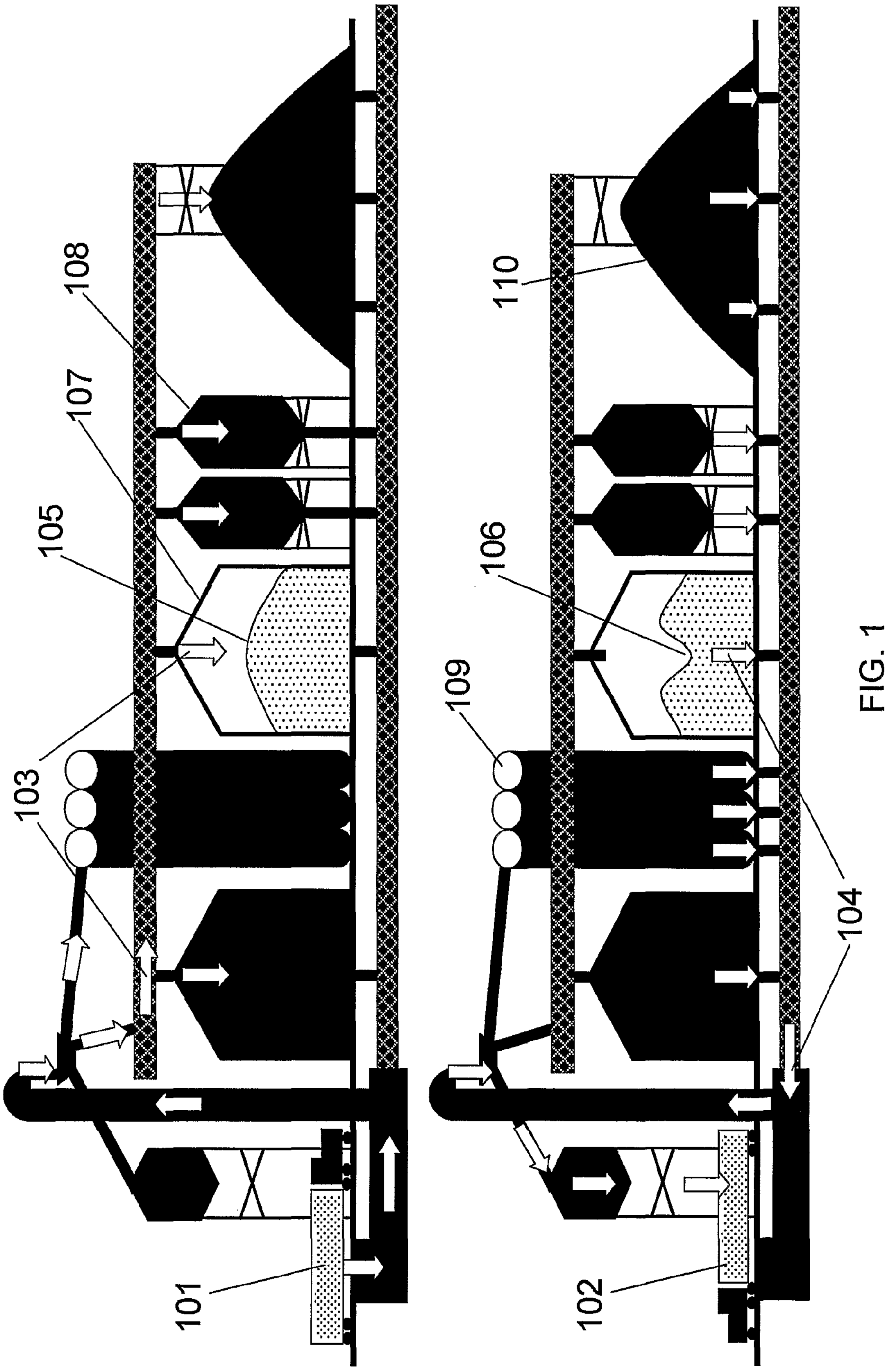
FIG. 1 is an illustration of inbound/outbound flow processes and different storage possibilities of a typical non-liquid bulk material handling facility.

The present invention recognizes that tracing non-liquid bulk materials from the origination source through to the end product consumer (e.g., cereal grain raw material such as corn ingredients from agricultural farm to consumer packaged product such as taco shells, or high sulfur fossil fuel coal commingled with other coal grades in stockpiles at utility plants) is an emerging national and global need driven by many factors, including increasingly stringent quality standards in the distribution chain. Such tracing is also important for food ingredients due to the desire to control and trace genetically modified organisms and national bioterrorism concerns regarding food security. For example, Section 306 of the Federal Bioterrorism Preparedness and Response Act of 2002 specifically requires all food handlers to establish/maintain records which identify at all times the "immediate previous source" (IPS) and the "immediate subsequent recipient" (ISR) of all food they handle in their operation. Regulators are highly interested in improving the complete farm-to-table cycle of a tracing investigation and need accurate IPS-ISR records to do so. As bulk handling techniques have scaled up over the past 50 years via larger storage containers and higher throughput conveying equipment, the side effect of "commingling" different loads from various sources within a particular storage container has become an accepted part of doing business. With quality and security trends now motivating origin tracing of such commingled loads, the present disclosure provides several embodiments for such origin tracing.

At the outset, several terms used throughout this disclosure are defined:

Bulk: any non-liquid bulk granular or powder material, e.g., grain, dry fertilizer, sugar, flour, mineral ore, salt, etc.

Container: a holding and/or storing location for a bulk material which may be in the form of a tank, bunker, bin, open pile (with or without partial containment), rail car, trailer, ship or barge hold, etc.

Source: the point of origin of a bulk load, the nature of which is context dependent, e.g., a source can be a farm or mine site, an intermediate processing site, a storage site, a storage container, etc.

Add: the introduction into a container of a single new load or multiple new loads of bulk material from one or more sources.

Load: a variable quantity of bulk based upon the mode of transportation (e.g., a dump truck, a tractor trailer, a railroad car, a river barge, a ship hold, etc.); a "load" is the capacity of each such conveyance, in normal industrial practice, delimiting a natural measure of input to a container of arbitrary size. Also, "load" denotes that any load has an associated origination source. Thus, tracking a load is equivalent to tracking a source.

Withdrawal: the removal of some amount of bulk from a container.

Intra-site: bulk handling actions that occur at a single bulk handling site.

Inter-site: bulk handling actions that occur between two or more sites, e.g., the point of origination, points in a transportation network that may include multiple bulk handling and storage facilities, processing facilities where the bulk is used as a raw material, the point of consumption of a finished bulk-derived product, etc.

Commingle: the co-location of two or more loads of a bulk within a container. Typically these loads are made up of nearly homogeneous material throughout the container. Thus, commingling the material is considered acceptable and economically necessary in the industry. However, some parameters (such as the "source" of each load) are not homogeneous.

Catalogue: to both an action and an item; the "catalogue" item is the physical repository of all relevant information for every bulk load traced at a facility or throughout a system of facilities; to "catalogue" a piece of information is to store that information in a catalogue.

Strata: the layers inside a bulk storage container created by the successive introduction of one or more bulk loads into the container.

Blend: the intentional mixing of bulks from one or more containers during the withdrawal stage of bulk handling.

Volume: a three-dimensional space occupied by and amount non-liquid bulk material that is equivalent to a particular mass of the same material via knowledge of the materials density.

Differencing or map differencing: either (1) the process of using two surface maps as upper and lower boundaries to locate one or more bulk material loads within a container and/or (2) the process of determining through calculations the volume occupied by the material residing between two surface maps, that may (i.e. bin or silo) or may not (i.e. open piles) be constrained by retaining walls of the container.

As is known, an effective way to accurately measure the volume of a non-liquid bulks is to combine knowledge of its storage container with knowledge of the bulk's surface shape and its density. The more accurate that one's knowledge of the surface shape is, the more accurate is the volume measurement. Such precise surface knowledge is normally attainable via surface (contour or topological) mapping. The present disclosure presumes the existence of a suitably accurate surface mapping technology or method by which precise surface height information is generated at a large enough number of locations across the upper surface boundary of a stored, bulk material to create a surface profile map of arbitrary accuracy and thereby the ability to compute the bulk volume. The term "suitably accurate" is primarily relative to the container diameter where, generally, the smaller the diameter, the fewer the number of data points needed to accurately describe the surface (for some small diameter containers, as few as one data point may be sufficient) versus very large diameter containers needing many hundreds of data points. In one embodiment, a Scanning Sensor Unit (SSU #1) surface mapping apparatus, provided by BinTech LLLP of Louisville, Colo., described in U.S. Pat. No. 6,986,294 B2 is used to map the surface.

Also, bulk handling facilities, and generally those industries where bulks are used, typically possess a means of quantifying, sampling and tabulating information about the load at the time a load arrives at the site or leaves the site. Such means can be as simple as paper copy forms for data entry or as sophisticated as computerized integrated weigh scale & sample results software programs. The present disclosure presumes the existence of a suitable "load" quantitative & qualitative data tabulation method. In one embodiment, a OneWeigh or BinSight software package, provided by Agris Corporation of Roswell, Ga. is used for such sampling and tabulation. In another embodiment, a GMS software package, provided by CompuWeigh Corporation of Cheshire, Conn. can be used for such sampling and tabulation.

For reference: an example of a sampling procedure is described by the USDA, GIPSA technical services division titled "grain sampling procedures" dated January 2001. Another sampling reference is the Canadian Grain Commissions Sampling Systems Handbook and Approval Guide. An example of a moisture content sampling procedure is described in the Canadian Grain Commissions Official Grain Grading Guide, dated Aug. 1, 2004. An example of a recognized moisture meter is described by Federal Register: Apr. 9, 1998 (Volume 63, Number 68)] [Page 17356-17357]" Implementation of a New Official Moisture Meter", Grain Inspection, Packers and Stockyards Administration, USDA. Specifically, the Grain Analysis Computer Model 2100 (GAC 2100), manufactured by Dickey-john Corporation, Auburn, Ill.

From these two elements (surface mapping/volume calculation and load data tabulation), one embodiment of the present invention then uses consecutive surface scans and incorporates the bulk load data to assemble a load history for a bulk container. In this manner, the location of individual arriving loads can be pinpointed inside the container without requiring impractical probes or impractical tagging of individual kernels or granules of material. Additionally, departing loads can be positively identified as originating from one or more of the loads introduced earlier to the container. Knowledge of the incoming and outgoing load sources yields the origination tracing capability for material passed through mass storage sites, such as grain elevators, sugar manufacturing plants, packaged food processors, precious ore mines, etc. This knowledge (the in situ precise location of the loads and load data for each load) further allows for the process of accurate load-out blend preplanning of another embodiment of the present invention.

Referring now to the drawing figures, and in particular, FIG. 1, bulk materials are typically processed through bulk material handling facilities. Such bulk handling facilities throughout the world come in many different configurations, capacities, and have many different means for shipping and receiving bulk materials. Such facilities may also house many different levels of processing where: some facilities may simply receive, hold, and ship the bulks, some facilities may perform various levels of value added processing of the bulk, and some facilities may process the bulks completely, resulting in final consumer products and by-products. FIG. 1 represents the key physical plant elements commonly contained in such bulk handling facilities. Such plant elements may include, for example: equipment to transport and receive loads in, equipment to convey loads in, various storage containers, equipment to convey loads out, and equipment to transport material out of the plant. FIG. 1 also provides an example cross section of how the bulk typically looks when loaded into and loaded out of a typical storage container.

As illustrated in FIG. 1, an incoming load 101 is received at the facility. As will be understood, such an incoming load may be transported by any of numerous material transports, such as truck, rail, barge, and ship, to name but a few. Similarly, an outgoing load 102 is output from the facility, and may be transported by any of numerous material transports similarly as described above. Typical inbound material flow routes are illustrated at 103, and may include and type of material handling equipment, such as, for example, conveyers, augers, etc. Typical outbound material flows routes are illustrated at 104, and may include any type of material handling equipment, similarly as described above. Bulk materials 105, when loaded into storage, form a convex (hill) shape and progressively grow in height from bottom to top without mixing. Bulk materials 106, when withdrawn from large diameter storage 107, form a concave (inverted cone) shape. Depending on the storage vessel, this cone down shape advances downward as the predominant flow shape for funnel flow systems or as part of the discharge geometry when plug flow is the predominant flow shape. Such large capacity storage structures 107 are commonly made of welded steel, corrugated bolted steel, or concrete, for example. Storage structures 107 may also include flat building storage, often called horizontal silos because these structures are also typically very large capacity due to the length of such structures; their cross sections are similar to large vertical storage structures. Flat storage structures are often made of various types of steel, concrete, and frequently wood members. Storage structures may also be overhead and hopper bottom storage structures 108, tall, narrow, small or medium capacity vertical storage structures 109 (often made of concrete and found constructed in groups or packs where the main holding spaces and the interstitial spaces are used for storing the bulk inventory). Storage may also be bulk piled inventory 110 which may or may not have confining walls.

Having generally described a bulk material handling facility, the tracking and identification of incoming, or added, loads is now described with reference to FIGS. 2, 3, and 4. The processing tasks of this embodiment include the following steps. First, record and organize identifying information for each incoming bulk load including, for example, source description, transportation mode, destination container or containers, material type, weight, density, moisture content and/or other quality-related measures obtained via small sample testing performed at time of load receiving. Next, associate an upper boundary surface topographic map with the incoming load. The map, in one embodiment, comprises a plurality of height measurements of the upper surface of the incoming load once it is reposing inside the destination storage container and can be assembled via manual, semi-automated or fully-automated processing. The next step is to calculate the volume of the incoming load in each destination container by computing the vertical difference between two (2) surface topographic maps and then computing the intervening volume: these two maps are the map associated with the incoming load and the last map of the container contents recorded prior to the arrival of the incoming load. If the container was initially empty, then the incoming load volume is calculated by computing the difference between the map associated with the incoming load and the map of the container's interior surface. The position of the incoming load is then located relative to previously stored loads, if any, within each destination container by identifying as the lower and upper boundaries the locations of the two (2) bounding surface topographic maps recorded immediately prior to and immediately following transfer of the load into the container. The relative location of these bounding surfaces remains nearly constant as additional loads are successively stacked on previous loads. Essential load-specific parameters are associated with each located load within a container including, for example, the load's upper and lower boundary maps, time and date, material type, weight, density, moisture content and/or other quality-related measures obtained via small sample testing performed at time of load receiving. Resulting boundary maps and associated information are stored in a catalogue, also referred to as a strata catalogue, for later recall and manipulation. This strata catalogue forms the basis for tracing load locations within a container. Finally, load configuration and multi-load strata assemblage may be reported on demand by convenient display or reporting methods based on all data associated with each load stored in a particular container. Display and reporting may be accomplished via manual, semi-automated or fully-automated means.

Figure 2:
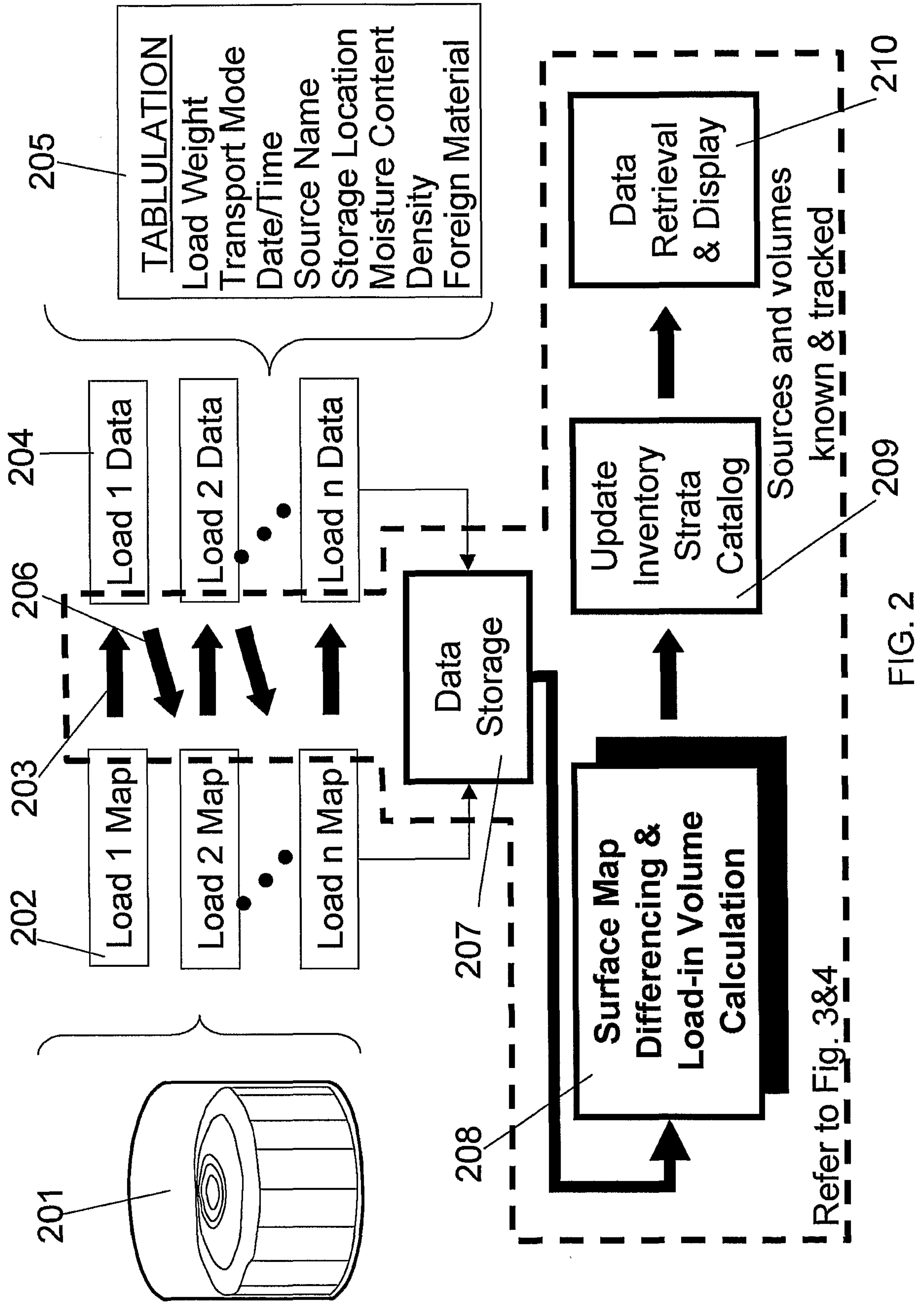
FIG. 2 is a block diagram illustration of a method for the inbound element for source location inside of a bulk materials storage vessel or pile of an embodiment.

With reference specifically to FIG. 2, surface contour map information 201 is collected by any available method(s). The inbound cycle starts with the first contour mapping event 202. The arrow 203 represents that the method begins in this embodiment with an initial map of the inventory regardless of whether the container is empty or partially full. The contour map data is logged in a database in chronological order relative to the subsequent adding of loads to the storage container. Load data 204 for the load of bulk material added to the container, including any pre-sample information such as sampling to acquire ingredient information is captured. This load data information along with the source origination information is catalogued. Inbound tabular load data 205, that is included with load data information 204, is included in this embodiment, and may include data such as listed in FIG. 2. The arrow 206 represents that the logged tabular data is to now be stored in the database, including a chronological date stamp of the last material addition. Additional material loads are then added, and the load-in data logged in chronological order relative to subsequent loads added to the storage vessel and relative to the previous mapping event. The database, or other data storage, 207 stores all of the relevant information related to the storage container and the loads added to the container. The database 207 contains the data stored in any of a number of ways such that relevant information may be accessed, elements in the database may include data for each load indicating chronological order, source labeling, etc. Surface map differencing is performed at 208. This is a mathematical process of comparing the first map to the second map with both being constrained by the storage vessel envelope. These boundaries are the basis for calculating the volume of the material added to the container between the consecutive mappings. Also in this step is the spatial placement and adjustment of all the loads in sequential order which are now constrained by: a lower map, an upper map, and the vessel enclosure boundary. Strata catalogs containing graphical image data and tabular records are created at 209. The graphical image data and tabular records can be displayed at 210. Such a display may include a computer display, and/or one or more printed reports, for example.

Figure 3:
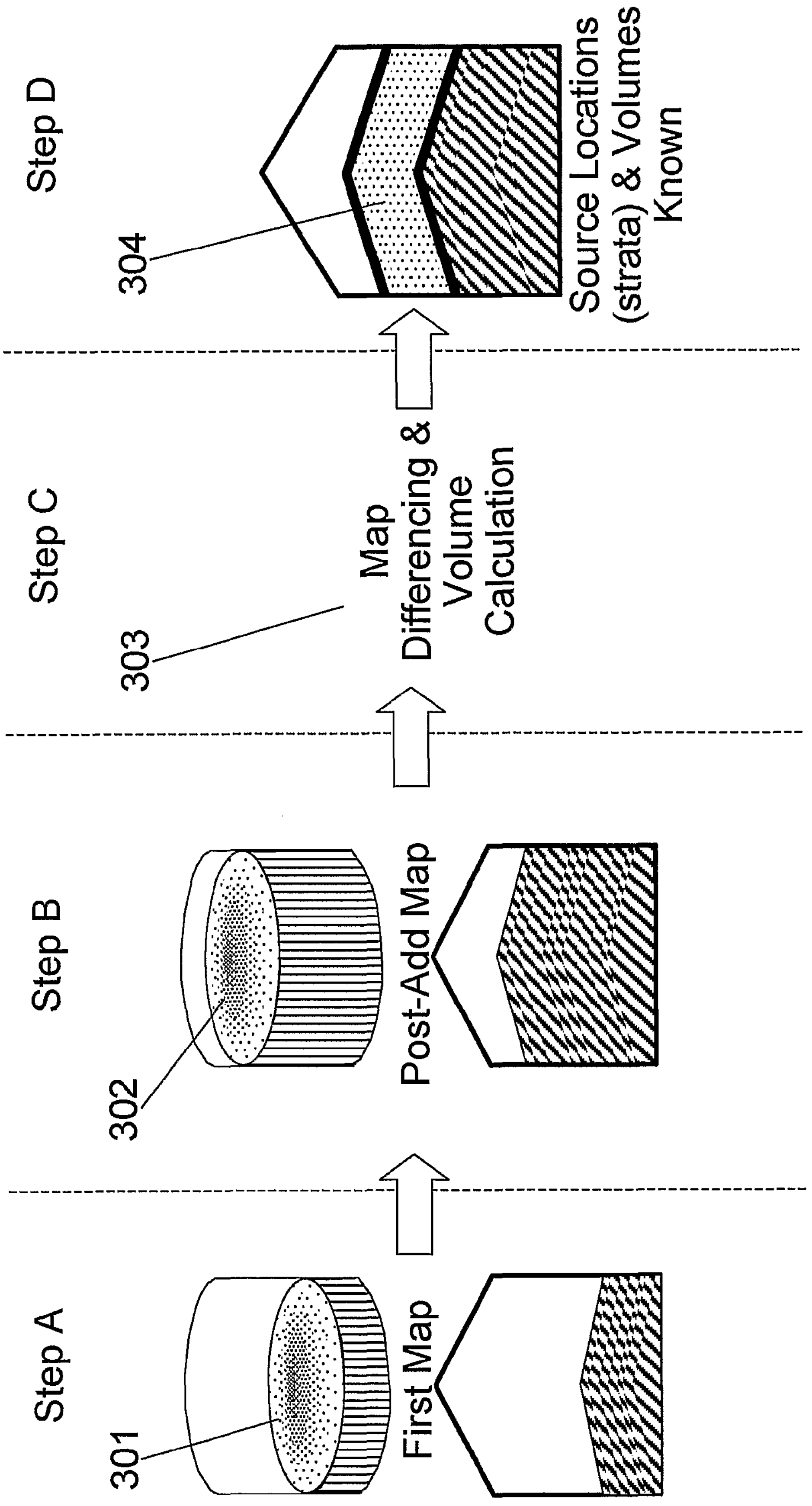
FIG. 3 is a cross sectional illustration of surface map differencing and strata logging for an inbound source location element of an embodiment.

Material additions to a single container are illustrated in FIG. 3. The surface of the bulk material 301 where a mapping event occurs first to acquire the contour data is illustrated as step A, both in perspective and in cross-section. The surface of the bulk after material was added 302 and where the next mapping event is commanded to acquire the post-add contour data is illustrated as step B. The surface map differencing process 303 establishes the top and bottom boundary positions of the loads added into the container, and is illustrated as step C. The top and bottom boundary positions combined with the vertical boundary conditions (i.e. walls of container), is the basis of the volume computation. This mapping process, combined with sequential load-in data, results in a precise inventory strata catalogue that is ready for display in a 3-Dimensional graphical representation or in report format. A cross sectional illustration 304 represents an example cross sectional output display of the accurately located bulk material that was added in the container, and is illustrated as step D.

Figure 4:
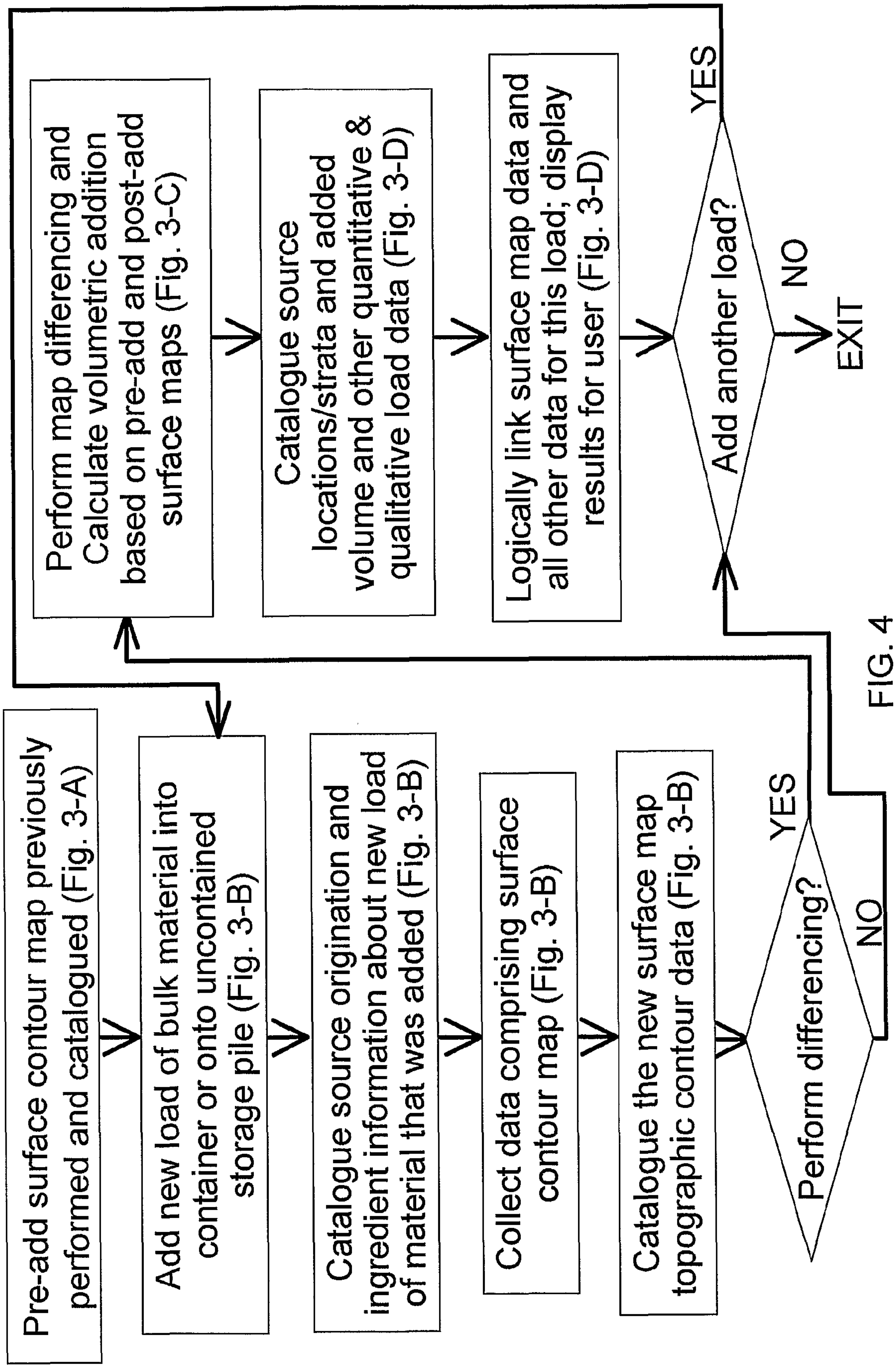
FIG. 4 is a flow chart illustrating the operational steps for the embodiment of FIG. 3.

FIG. 4 is a flow diagram that illustrates the general process steps required to map, locate, characterize and catalogue bulk material loads added to a container where they become commingled as shown through steps A, B, C and D of FIG. 3. In step A, a pre-addition surface map is confirmed for the preexisting material in the container along with source information and bulk property data. In the event that the container is empty prior to the start of step A, such a pre-addition surface map is simply a map of the empty container. Step B includes four operations, and begins when a new bulk material load is added to the container and the load's associated source identifier and bulk properties are catalogued, with this information stored on the site computer or in the above-mentioned database. A surface map of the resulting total inventory is collected and this information is also catalogued with the incoming load data. At this point, the operator reaches a decision box where he may choose to bypass further load characterization calculations and proceed to a choice of adding another load or exiting the procedure. If he chooses not to bypass the calculations, processing proceeds to step C where the map differencing between the post-add surface map and the pre-add surface map is performed. The resulting difference map is then catalogued in step D in association with the new load's source, location, and material properties while logical links are established among the load's various catalog data elements. At this point, the operator may choose to exit the procedure or add more loads to the container, repeating the same mapping, differencing and cataloging operations. If, after completing step B, the operator chooses to bypass difference map calculations, he has the choice of accepting additional loads into the container or exiting the procedure.

Figure 5:
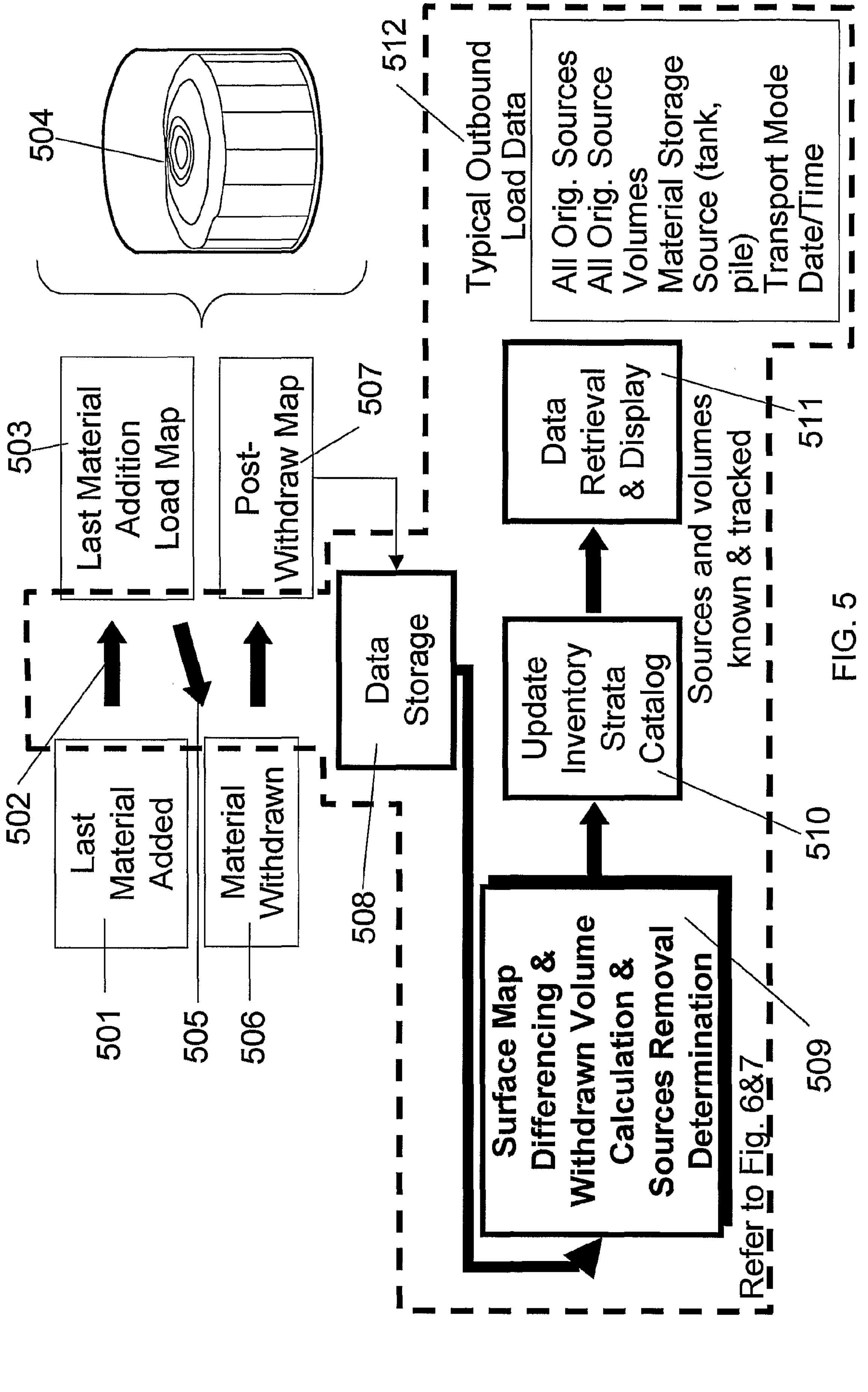
FIG. 5 is a block diagram of a method for the outbound element for source location inside of a bulk materials storage vessel or pile for an embodiment.
Figure 6:
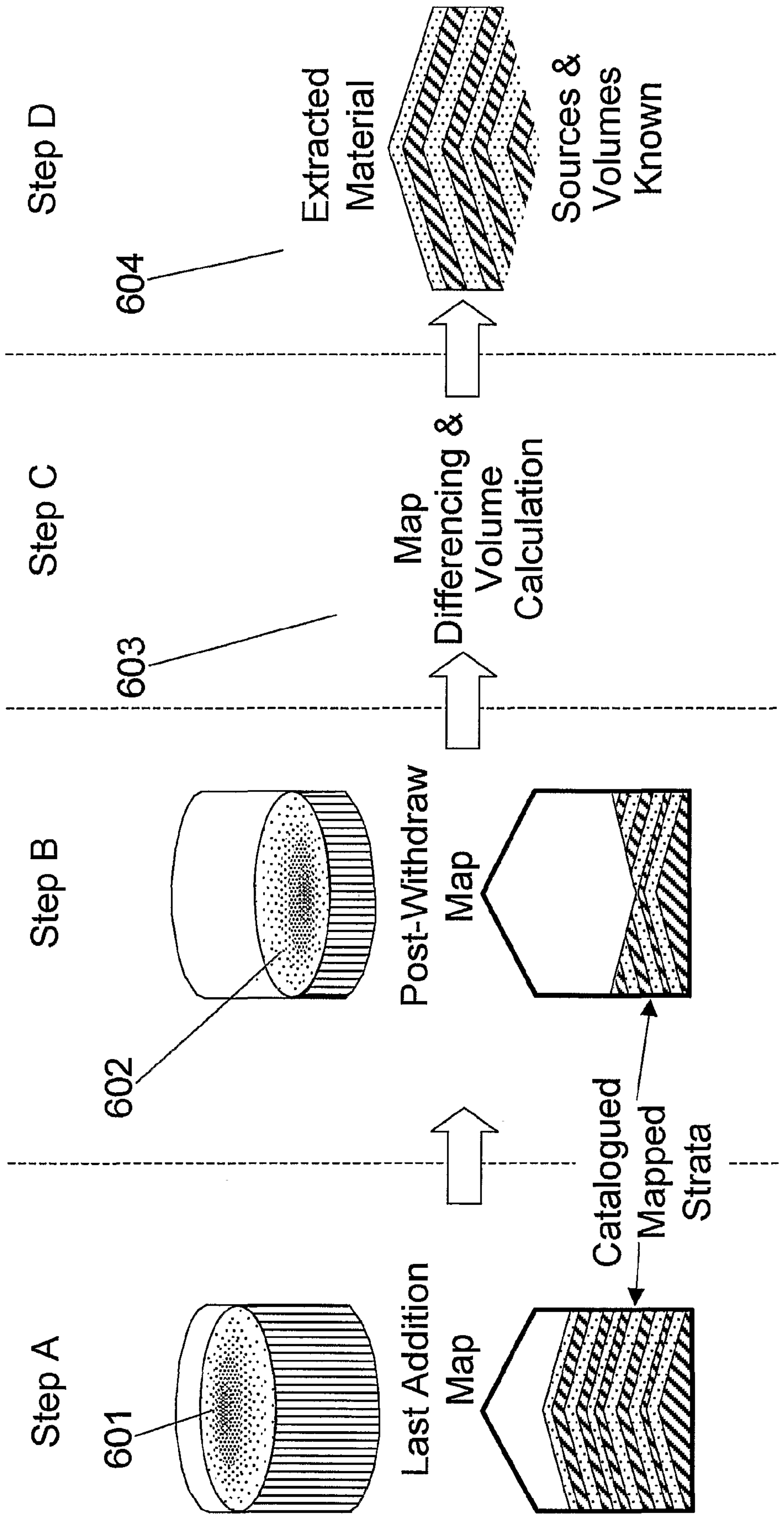
FIG. 6 contains cross sectional illustrations for surface map differencing and strata logging for the outbound source location element of the method of an embodiment.
Figure 7:
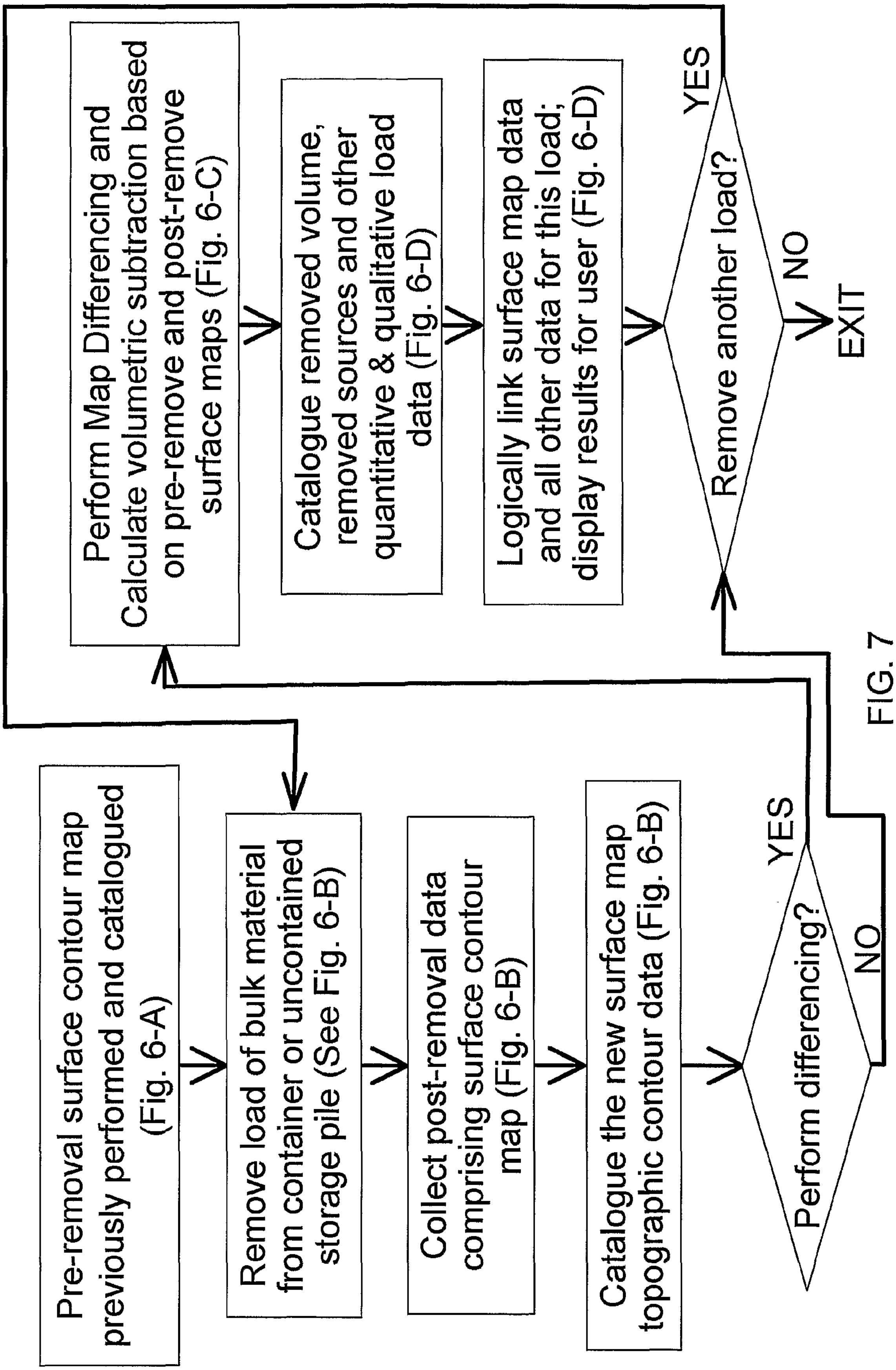
FIG. 7 is a flow chart illustrating the operational steps for the embodiment of FIG. 6.

Referring now to FIGS. 5, 6, and 7, withdrawal of material and associated operations are described. In this embodiment, information related to material withdrawal is processed as follows. Initially, an upper boundary surface topographic map is associated with the outgoing load. This map may be recorded between the time of last load-in or load-out and the impending load-out operation. The map includes a plurality of height measurements of the upper surface of the stored bulk material reposing inside the source storage container and can be assembled via manual, semi-automated or fully-automated processing. Previously catalogued essential identifying information is associated with each outgoing bulk load including, for example, origination source identifiers, source storage container or containers, time and date, material type, weight, density, moisture content and/or other quality-related measures that may be obtained via small sample testing (if any) performed at time of load-out. A lower boundary surface topographic map is then associated with the outgoing load. This map represents the upper surface of the remaining bulk material in the source storage container after removal of the subject load. This map's measurements are recorded following completion of the load-out operation and can be assembled via manual, semi-automated or fully-automated processing. The volume of the outgoing load may then be calculated via map differencing by computing the vertical difference between the two (2) surface topographic maps and then computing the intervening volume. The two maps are the maps associated with the upper and lower boundaries of the outgoing load. Furthermore these two map associations and differentiation and their strata log will determine the volume percentage breakdown of each of the load sources contained in the load-out total volume. The strata catalogue is updated to account for the withdrawal of material from the container based on the map differencing calculation of the previous step. The source-specific fractional content of the outgoing load is calculated using source locations determined from the strata catalogue before and after the load-out procedure. Included is the fractional content of the mixed core region of the stored material. This source content information for the outgoing load is then stored. The resultant configuration and multi-load strata assemblage of the remaining material in the storage container or containers may then be reported by graphical display and/or reporting methods based on data associated with each load stored in a particular container and the last available post-load-out surface topographic map or maps. Display and reporting may be accomplished via manual, semi-automated or fully-automated processes.

With reference to FIG. 5, such a system is described in more detail. The outbound cycle of the method of this embodiment begins at 501 when the last bulk material load has been added to the storage container. Arrow 502 represents that the first active step in the method is to call for the contour mapping event. The chronological date/time stamp of the last material addition is now organized through the method as the first catalogued method event in a database. This map can also correspond to a mapping performed in sequence with the previous inbound load process as described previously with respect to FIGS. 2-4. After the last material is added, a contour mapping 503 is performed. This contour mapping event generates a surface contour map 504, and may be collected by any available mapping technique. Arrow 505 represents that the surface contour data is catalogued in the database and is associated with a chronological date/time stamp. At this point, an amount of bulk material is removed from the container illustrated at 506, and contour mapping 507 is performed. The contour data is cataloged in the database illustrated at 508. The database 508 contains the relevant load data and mapping data, along with data indicating chronological order, and source labeling, for example. Surface map differencing 509 is then performed. This differencing is a mathematical process of comparing the first map to the second map with both being constrained by the storage vessel envelope. These boundaries are the basis for calculating the material withdrawn from the container. Differencing also includes the comparison of the pre- and post-withdrawal strata catalogs which determines sources and amounts of sources that have been withdrawn from the container. Strata catalogs 510 containing graphical images and tabular records are created. The graphical images and/or records can be displayed at 511, such as by computer, and/or printed reports, for example. New data indicated at 512 is thus connected to the outbound loads and is now available. This data is associated with the knowledge of the specific layers and specific original sources that were removed.

Referring now to FIG. 6, illustrations of a storage container at various stages of the material withdrawal process are now discussed. Initially, at step A, the surface of the bulk material 601 is illustrated where a mapping event occurs to acquire the contour data after the last load has been added. At step B, material is withdrawn from the storage container, and the surface 602 of the bulk is illustrated after material was withdrawn and where the next mapping event occurs to acquire the post-withdraw contour data. at step C, the surface map differencing process establishes the top and bottom boundary positions of the loads withdrawn from the container as indicated at 603. This, combined with any vertical boundary conditions (i.e. walls of container) is the basis of the volume computation. This mapping process, combined with sequential load-in data, results in an updated precise inventory strata catalogue that may be displayed in 3-dimensional graphical format and/or in report format. This also provides the "removed" strata catalog information through a simple process of comparing the before and after strata catalog conditions. The result of this method step is outbound source & volume tracking and remaining material strata cataloging. An example cross sectional output display 604 of the accurately located bulk material that was removed from the container is illustrated in step D. This shows that extracted material from each of multiple loads that made up the removed bulk material is accurately tracked and catalogued.

FIG. 7 illustrates a flow diagram of the process steps of this embodiment to map, locate, characterize and catalogue bulk material loads removed from a container where they were commingled, as shown through steps A, B, C and D of FIG. 6. In step A, a pre-removal surface map is confirmed for the preexisting material in the container along with source information and bulk property data. Step B begins when a new bulk material load is removed from the container and the load's associated source identifier and bulk properties are catalogued on the site computer. A surface map of the resulting inventory is collected and this information is also catalogued with the incoming load data. At this point, the operator reaches a decision box where he may choose to bypass further load characterization calculations and proceed to a choice of removing another load or exiting the procedure. If he chooses not to bypass the calculations, processing proceeds to step C where the map differencing between the post-removal surface map and the pre-removal surface map is performed. The resulting difference map is then catalogued in step D in association with the extracted load's source(s) and material properties information while logical links are established among the load's various catalog data elements. At this point, the operator may choose to exit the procedure or remove more loads from the container, repeating the same mapping, differencing and cataloging operations. If, after completing step B, the operator chooses to bypass difference map calculations, he has the choice of removing additional loads from the container or exiting the procedure.

Figure 8:
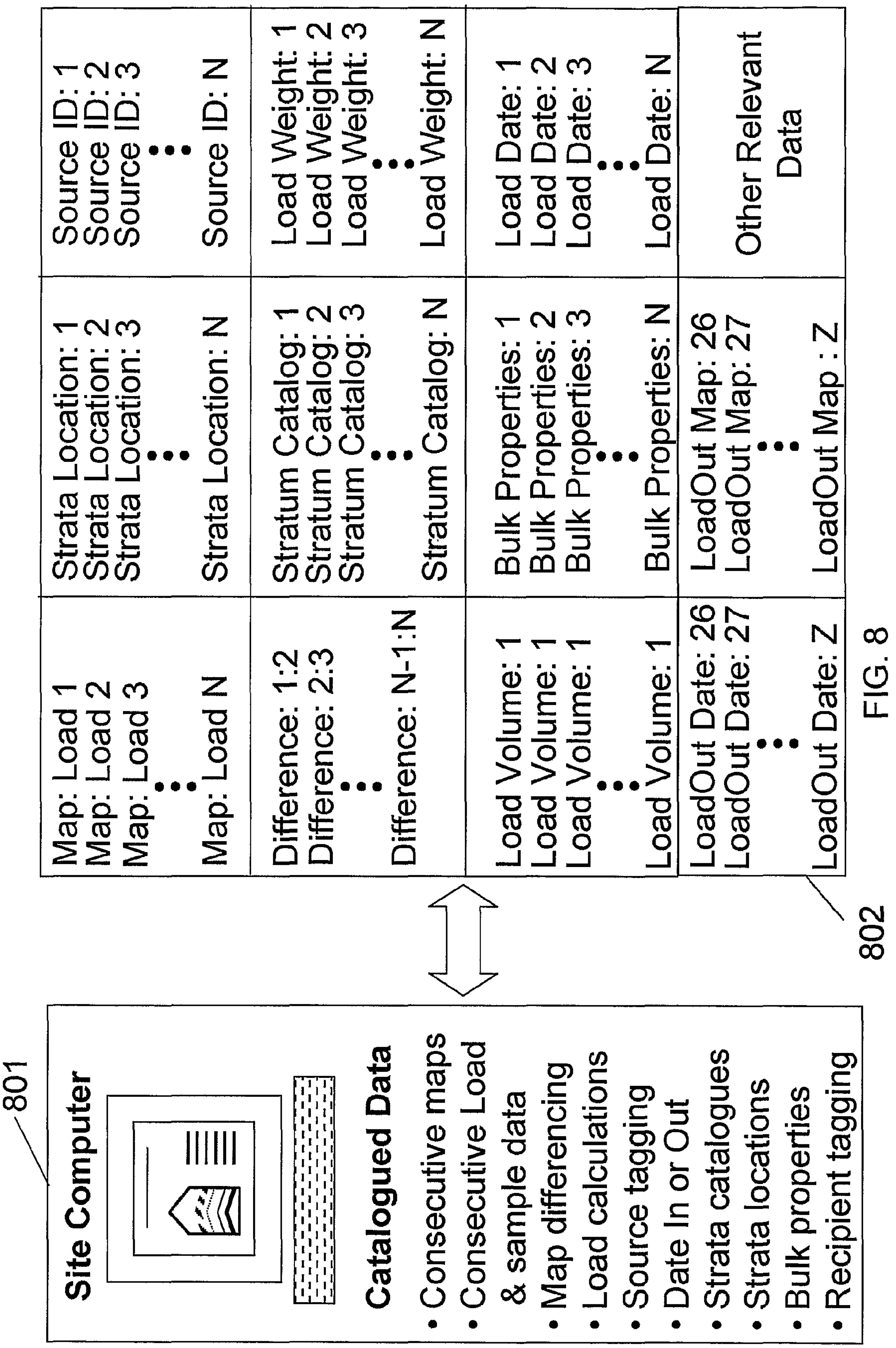
FIG. 8 is an illustration of a table/database of one embodiment where a log of different additions and withdrawals is kept, along with characteristics of each load.
Figure 9:
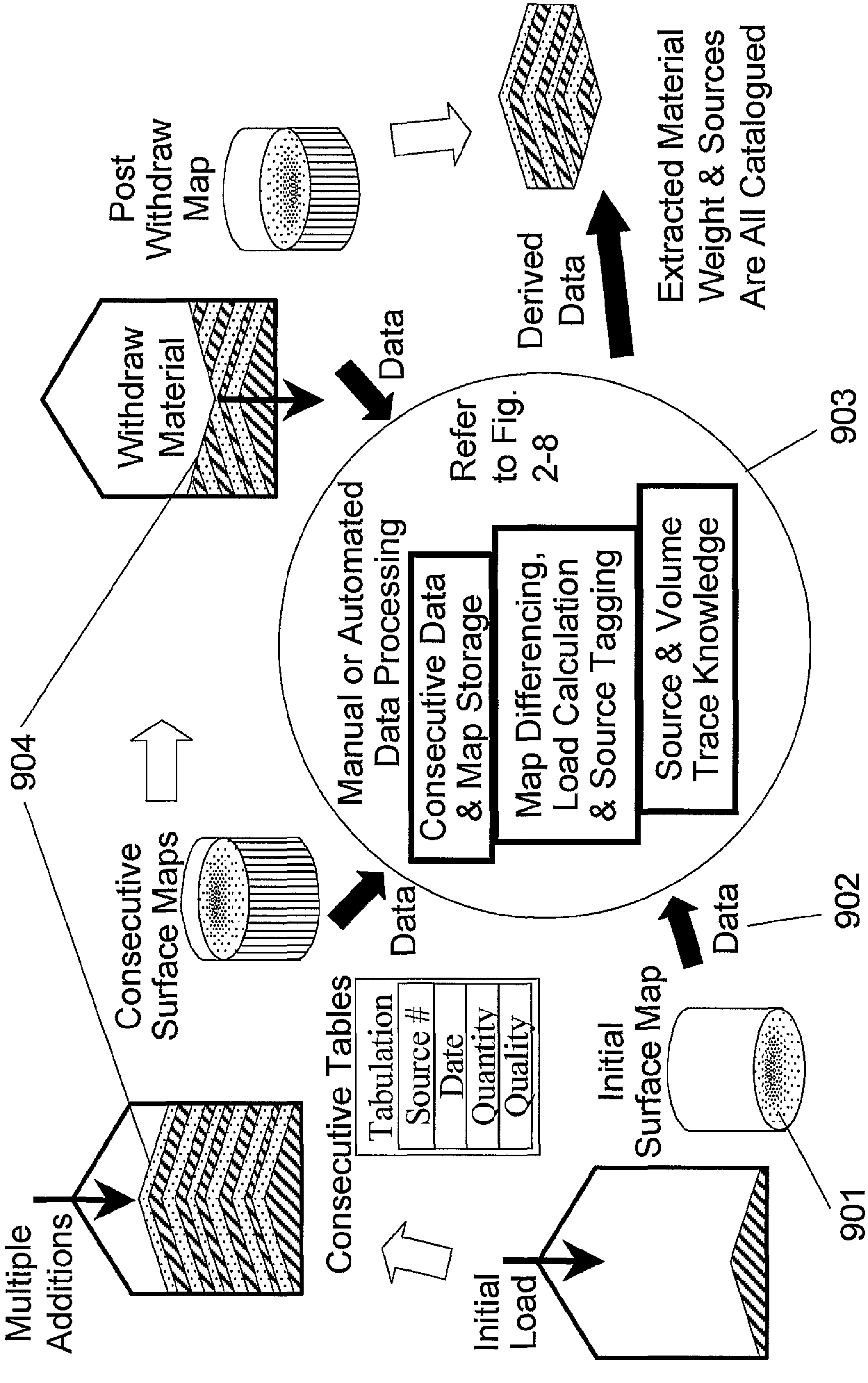
FIG. 9 is a system diagram of a combined inbound and outbound single container method of source location and tracking of one embodiment.

Referring now to FIG. 8, a graphical representation of a database of one embodiment is now described. In this embodiment, data sets stored in the database 802, a processor, such as a site computer 801, processes the data sets, and categorical organizations of the processed and cataloged data are generated. All such data is available for recall, display, and reporting through a graphical user interface, and/or other data reporting. In this embodiment, the site computer 801 is capable of collecting any number of a wide variety of information types generated for a storage facility, such as time of arrival, destination container, surface maps, layering sequence, material properties, source identity, outgoing load data, outgoing load recipient, strata catalogues, and source pedigree such as grain hybrid/GMO, to name but a few. This information relating to each of the distinct bulk material loads residing within each of the storage containers at a particular site, plant or facility. The database 802, as will be understood, may be any logical arrangement of data that is stored in spreadsheets, data tables, and/or database(s). The database contains all data that is deemed to be relevant to the management of bulk materials brought to, residing at or carried away from a particular site, plant or facility Referring now to FIG. 9, a system diagram representing the previous elements of the embodiments of FIGS. 1-8 is illustrated for an embodiment. In this embodiment, the previously described elements are combined to provide location and tracing capability of load(s) (inbound and outbound) through an individual bulk storage container. The initial state and the starting point of the overall method/location system is illustrated at 901 when an initial load is added to a storage container. Arrow 902 represents the cataloging of data into a database, the data including some or all of the previously described information that may be associated with a load of material that is added to a container. Data processing, cataloging, and displaying/reporting of information is performed at 903, and may be performed in a manual, automated, or semi-automated fashion. Additions/withdrawals 904 are performed in a similar manner as described above, with relevant data catalogued at 903. Data representing strata information, source information for loads added and/or withdrawn from the container, and volume information related to any, some, or all of the add/withdrawals may be generated.

Figure 10:
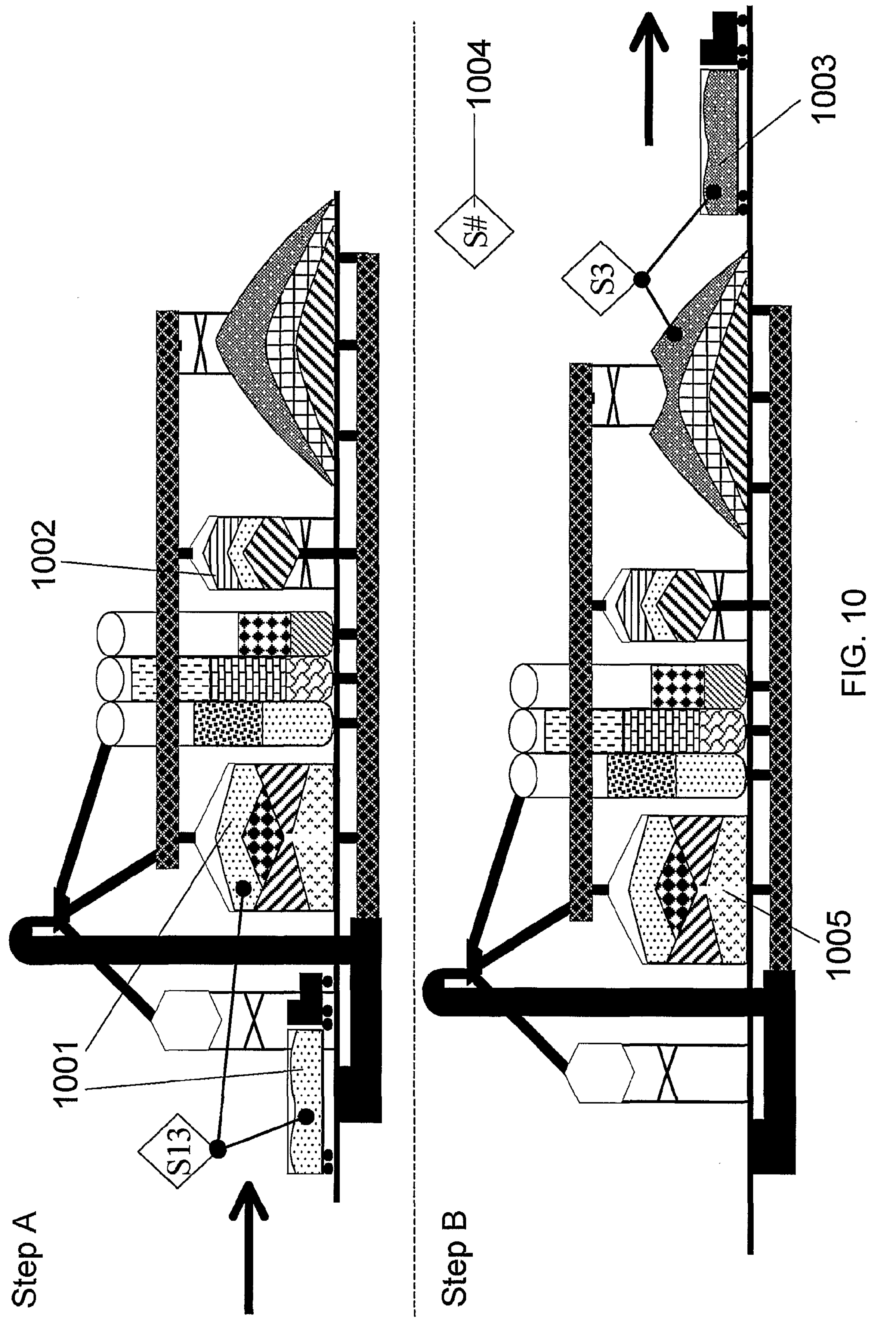
FIG. 10 is a cross sectional diagram of intra-site source location and tracking of an embodiment.
Figure 11:
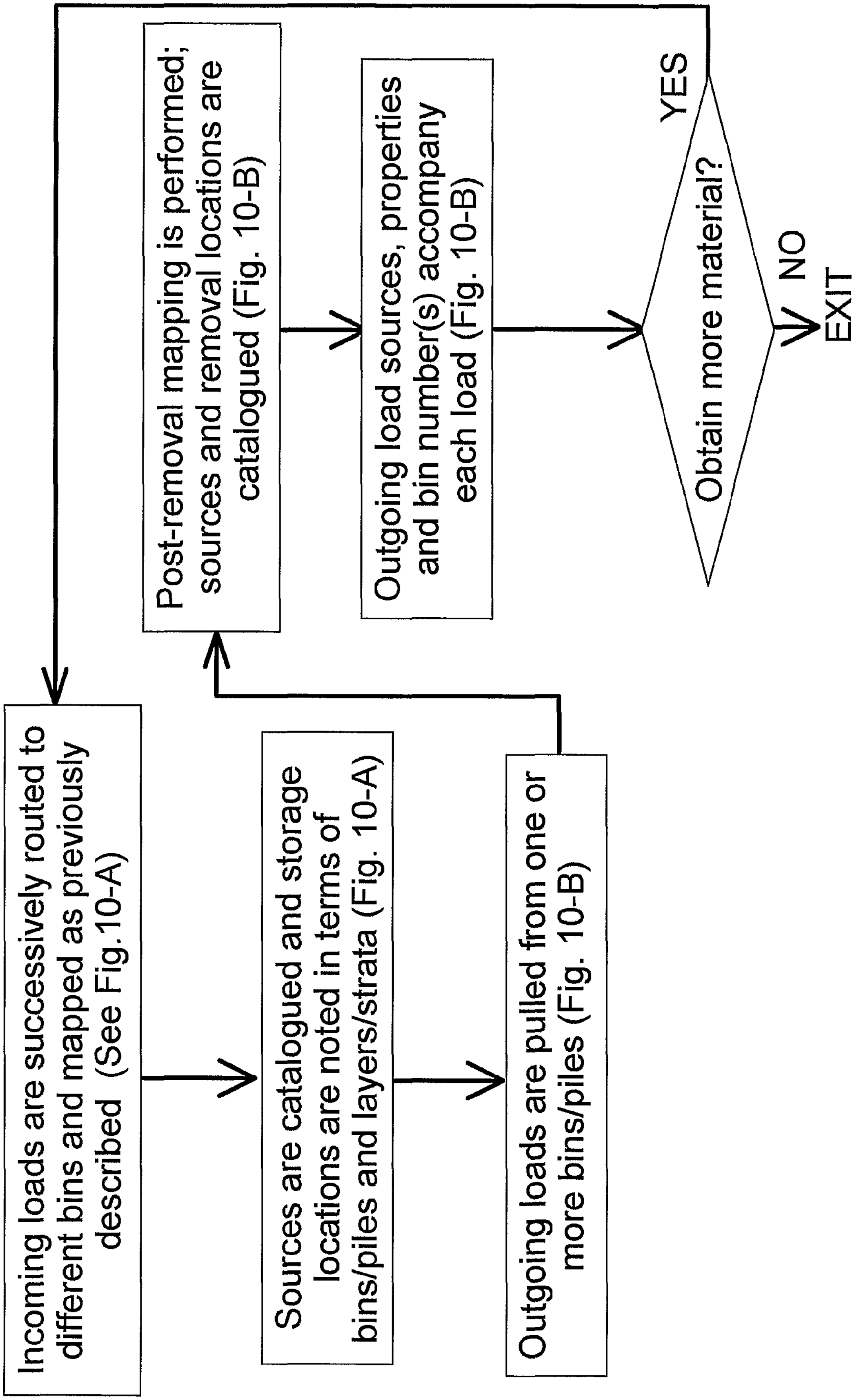
FIG. 11 is a flow chart illustrating the operational steps for the embodiment of FIG. 10.

Referring now to FIGS. 10 and 11, the movement of material and processing tasks of an embodiment are described. At step A of FIG. 10, loads of bulk material arrive at a site. The individual arriving loads are located by recording and manipulating information on production origins, volume and weight, transportation mode, storage containers and material strata locations within each container at the facility in a similar manner as described previously with respect to FIGS. 2-8. At step B of FIG. 10, loads of bulk material are removed from the site. The individual departing loads are located and traced by recording and manipulating information on production origins, volume and weight, transportation mode, source storage containers and material strata locations within each container at the facility in a similar manner as described previously with respect to FIGS. 5-9. A strata catalogue and database is built and maintained, as previously described, for each container at the bulk handling site. These catalogues are used to trace the disposition and source of individual loads from inbound delivery (via truck, railcar, etc.) through any on-site storage phase, to outbound load-out or processing. The resultant configurations and multi-load strata assemblages in the individual storage containers may be reported for any container and/or for the facility as a whole, by graphical display and/or reporting methods based on data associated with each load. As discussed previously, display and reporting may be accomplished via manual, semi-automated or fully-automated processes. In this embodiment, a cross section illustration of the containers illustrates a number of load cycles (a combination of loading in and loading out). This is the typical process seen at many bulk material handling facilities. The integrity of the strata cataloguing accuracy is maintained, in this embodiment, by an operator adhering to the following procedures: a.) Perform mapping and data cataloguing at the end of the fill cycle. b.) Withdraw bulk material. c.) Perform mapping and cataloging at the end of the withdrawal cycle. d.) Perform map differencing, source tabulation reference, volume calculations, source/volume tabulation of outbound material, source strata catalog update for material remaining in storage. e.) Add new bulk material load on top of cone down existing material. f.) Repeat above procedures to consecutively map material additions and withdrawals, source locations inbound and outbound, and strata catalogue updates. In this embodiment, the operator maps between each add (or multiple add) or withdrawal (or multiple withdrawal) cycle before changing the direction of the load-in versus load-out cycle.

Referring again to FIG. 10, a typical inbound load, such as load 1001 arrives at a facility, where samples are collected, samples are analyzed, sample data is documented typically in tabular form either manually or through a software system. Also, as illustrated, the load 1001 is moved from the inbound transport to the storage vessel where its placement puts it at the top of the inventory (in terms of location) in that vessel and in terms of utilizing the method of this embodiment to document this location. The graphical output such as illustrated at 1002 from this embodiment provides the discrete location of all loads inside any selected storage vessel or pile on an intra-site basis for an entire bulk handling facility. A typical outbound load 1003 of this embodiment has a discrete history that is now known pertaining to what sources and source contents are present in the outbound load 1003. Instead of the operator having to guess what the pedigree of the load is or having to assume that the load is made up of some of every previous load added to the storage vessel (and subsequently withdrawn to make this load), the operator now accurately knows, by use of this embodiment, the specifics of what makes up this load 1003. A primary tag/label 1004 for each of the source layers that can be displayed two dimensionally, three dimensionally, and in various report formats. This tag/label includes information such as all of the original source history, constituent ingredients, sample data, intra-site movement, etc. This embodiment also accounts for mixing of sources during withdraw/load-out both at the core and along the margins of the core for a particular storage container, as illustrated at 1005.

With reference now to FIG. 11, a flow diagram illustrates a summary of how source identification and material properties data of inbound loads are reliably located and traced through commingled storage containers to outbound shipments as shown through steps A and B in FIG. 10. In step A, incoming loads are successively routed to different containers and mapped similarly as previously described in FIGS. 2-4. Sources are catalogued and storage locations are noted in terms of bins/piles and layers/strata. In step B, outgoing loads are pulled from one or more bins/piles. The strata catalog and knowledge of each container's load-out geometry are used to identify all contributing loads to the output load, applying, for example, logical, computer-based identifier tags. Post-removal mapping is then performed; and sources and removal locations are catalogued and outgoing load sources, properties and container number(s) accompany each load such as previously described in FIGS. 5-7. Following the last post-removal operation, the operator may choose to obtain more material from available container inventory or exit the procedure.

Figure 12:
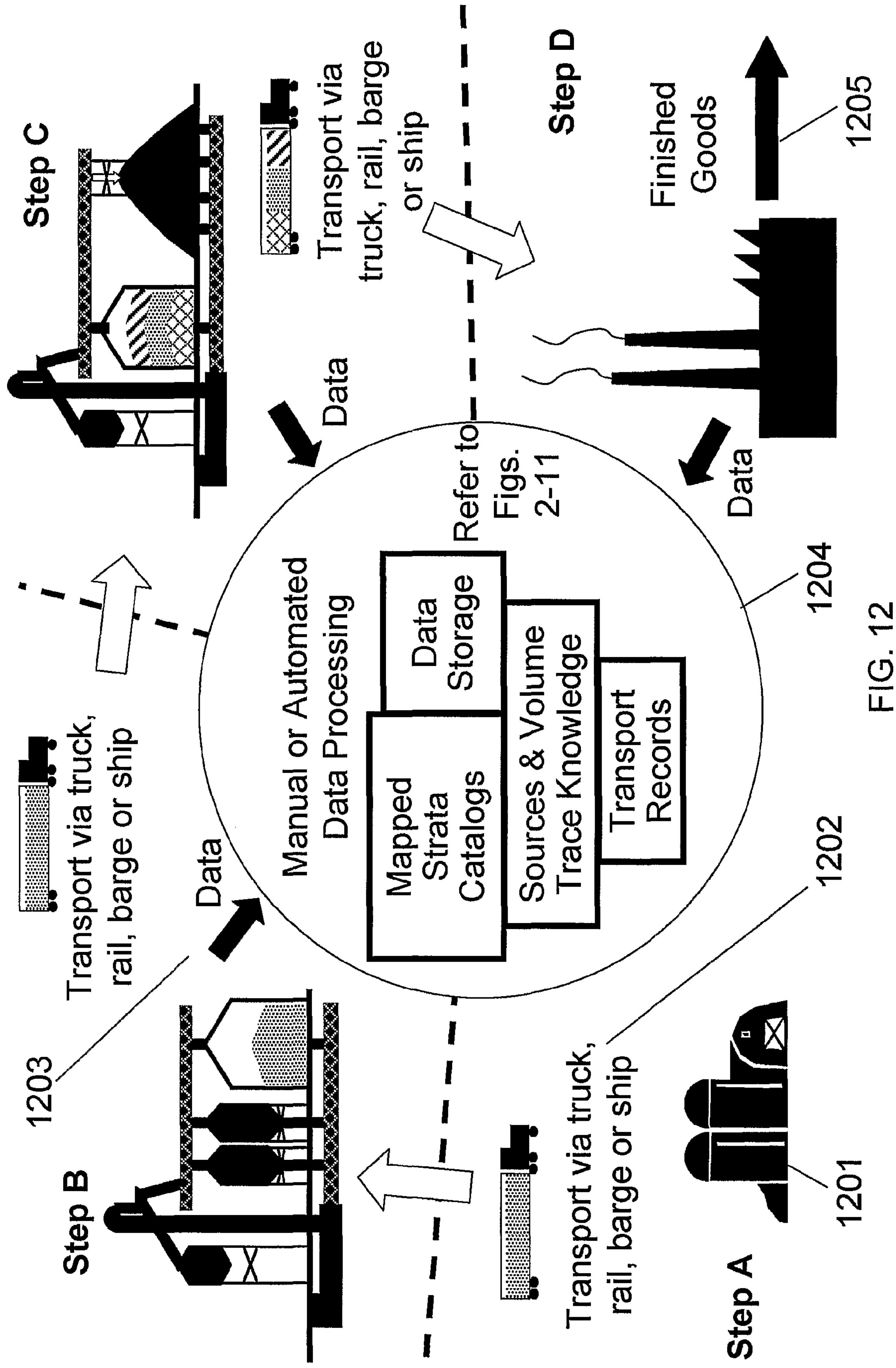
FIG. 12 is a system diagram of an inter-site method of life cycle source location and tracking for an embodiment.
Figure 13:
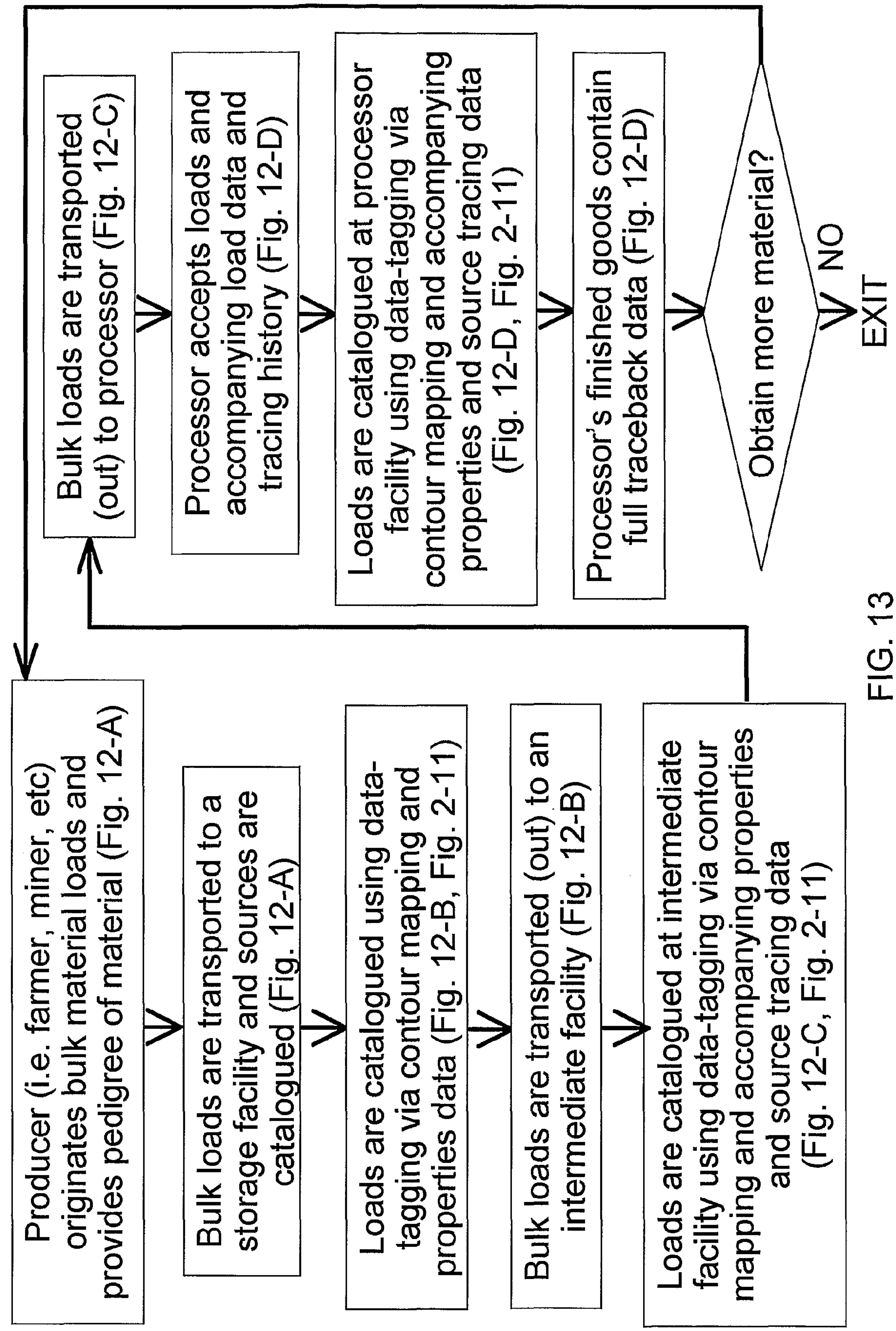
FIG. 13 is a flow chart illustrating the operational steps for the embodiment of FIG. 12.

Referring now to FIGS. 12 and 13, a complete material cycle is described. In this embodiment, material may be traced from the original source, such as a farm or individual field at a farm, to finished goods sold to end consumers. The processing tasks of this embodiment include first, tracing all individual arriving loads by recording and manipulating information associated with the materials such as production origins, volume and weight, transportation mode, storage containers and material strata locations within those containers at each facility in a logistical chain in a similar manner as described with respect to FIGS. 2, 3, 4, 8 and 9. Next, all individual departing loads are traced by recording and manipulating information on production origins, volume and weight, transportation mode, source storage containers and material strata locations within those containers at each facility in a logistical chain in a similar manner as described with respect to FIGS. 5-9. A system, via manual, semi-automated or fully automated techniques, combines the cataloging and report information such as described in FIGS. 2-9 for each bulk container on the bulk site such as a site depicted in FIGS. 10-11. A system, via manual, semi-automated or fully automated techniques, then generates the reported information such as described in FIGS. 2-11 at each facility in a logistical chain available for inspection and manipulation by personnel or automated systems at every facility in the same logistical chain, as well as by personnel or automated systems at other sites.

Referring again to FIG. 12, a point of origination 1201 in the inter-site system diagram is illustrated. Such a point of origin 1201 may include many types of sources such as a farm, for example, that can provide detailed information including the type and safety rating of the herbicide used to grow a grain crop. Even though the grain is handled in a commingled fashion throughout its life cycle, this type of information can be carried all the way to the disclosure label on finished consumer products using embodiments of the present disclosure. The bulk material is transported via various modes 1202 as it moves from handling point to handling point. The arrow 1203 represents a typical element of the overall method/location system that is the cataloging of data into a database. The inter-site system of this embodiment includes data processing, cataloging, and ability to display/report information 1204. Among other types of information, accurate records of ingredient sources traced through the entire bulk handling network are made possible by this ability to track commingled bulk materials through each container. For example, specialized wheat (e.g., a high protein hybrid) grown at a farm and then commingled through the food chain to be traced all the way to the bakery where it is delivered as flour and then made into bread for consumers. Another example is that the U.S. Food & Drug Administration can reliably trace and locate a genetically modified soybean lot approved for livestock feed, but not for human food. Such a soybean lot may accidentally enter the food network, and be located and removed from any human food chain. A finished good 1205, being the consumable product is ultimately produced at the end of the handling cycle. Using the embodiment of FIG. 12, a finished product can carry useful origination information such as its safety for consumption or the age of the ingredient relative to expiration dates. Some finished goods that contain bulk material ingredients are: potato chips, breakfast cereal, a loaf of bread, livestock/pet food, highway de-icing salt, and feed coal for a power plant, to name but a few.

Referring now to the flow diagram of FIG. 13, the operational steps of an embodiment are described to illustrate how source identification and material properties data of bulk material loads are reliably located and traced on a site to site, or inter-site, basis as shown in steps A, B, C and D of FIG. 12, beginning with initial transfer from a producer site through any number of commingled storage and intermediate handling locations to finished goods processing and shipment into a wholesale/retail distribution chain. Step A requires initial transfer of the bulk material from a producer to a bulk material storage site along with information related to the quality and safety pedigree of the material. The initial storage site catalogues the load's bulk property and pedigree information. In step B, the load is deposited into one or more containers where surface maps are collected, map differencing is performed and the material strata locations are determined. All of this information is added to the site catalogues to tag the load for tracing through subsequent handling and transfer operations. Eventually, this load will be transferred away from this initial site. Step C shows that upon arrival of a load at an intermediate handling and transshipment site, the load's accompanying source and pedigree data are entered into the site catalogues. Once deposited into one or more containers at this intermediate site, surface maps are collected, map differencing is performed and the material strata locations for the load are determined. As at previous sites, all of this information is added to the site catalogues to tag the load for tracing through subsequent handling and transfer operations. The contents of this load may proceed to additional handling sites, but eventually it will be transferred to a processing site. In step D, the processing site accepts the load, deposits it into one or more containers and enters its accompanying source and pedigree information into the site catalogues. Surface maps are collected, map differencing is performed and the material strata locations are determined. The load is data-tagged with respect to location inside each preprocess container along with all the recorded history and pedigree information associated with it. Finished goods produced with this load ultimately carry this information to the end consumer for safety and quality verification.

Figure 14:
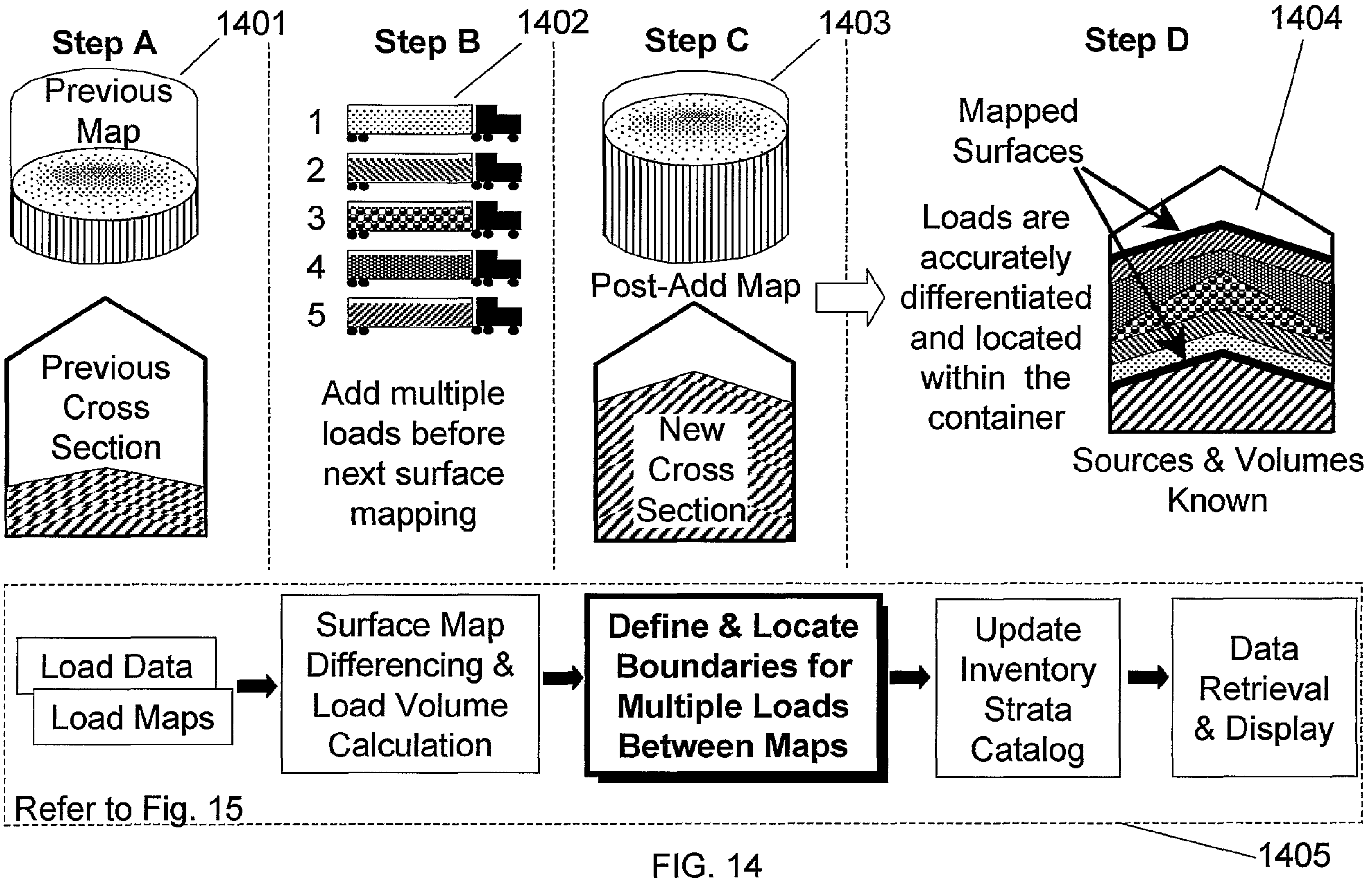
FIG. 14 contains cross sectional illustrations for inbound multiple loads that are sporadically mapped for surface map differencing and strata logging source location of an embodiment.
Figure 15:
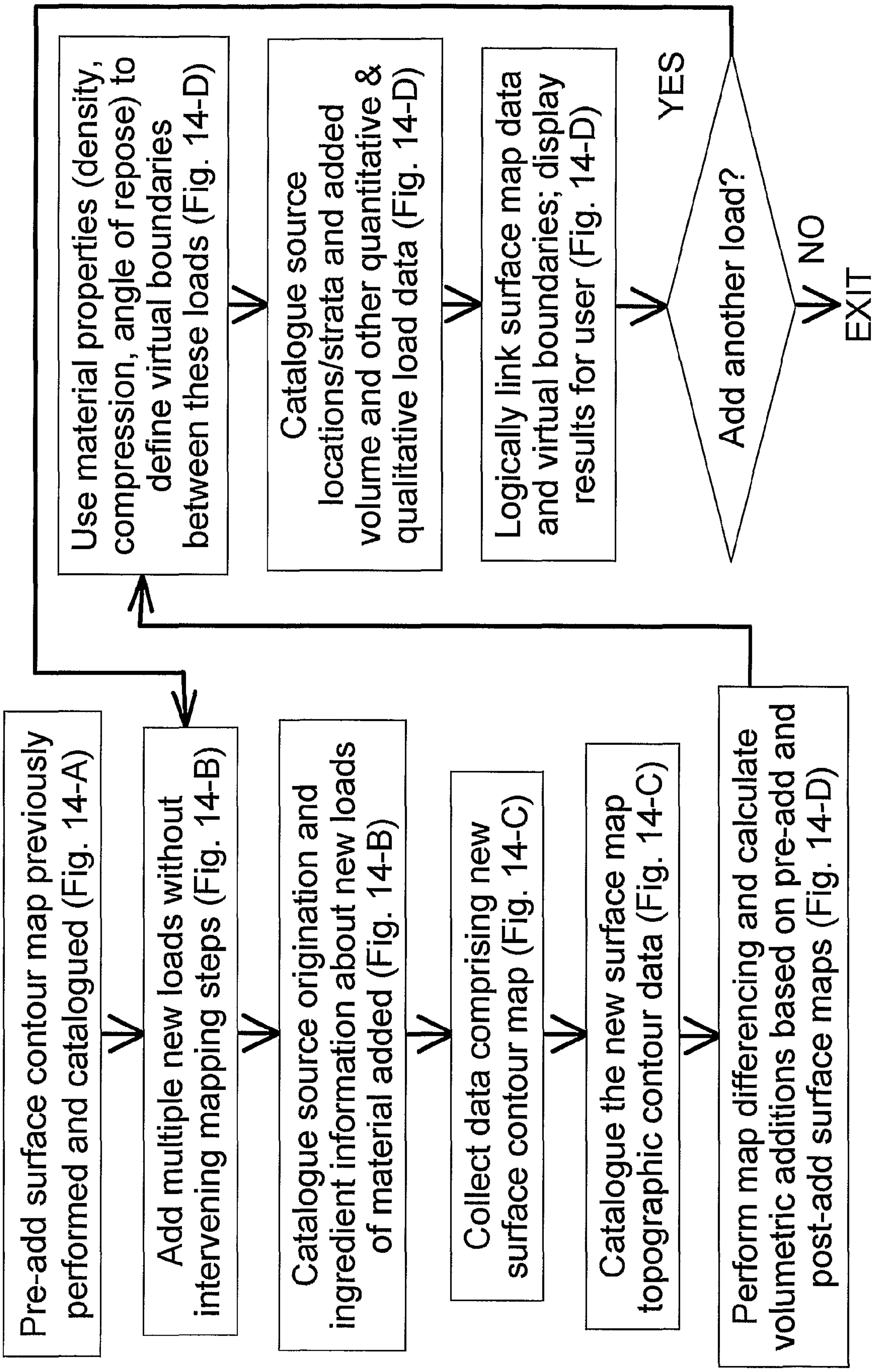
FIG. 15 is a flow chart illustrating the operational steps for the embodiment of FIG. 14.

Referring now to FIGS. 14 and 15, another embodiment of the present invention is described. In this embodiment multiple loads are delivered to a bulk storage container. Initially, an upper boundary surface topographic map is associated with the existing inventory. This is normally recorded immediately prior to a multiple load addition and can occur after either a load-in or load-out event. The next step is to record and organize identifying information for each incoming bulk load including, for example, source description, transportation mode, destination container or containers, material type, weight, density, moisture content and/or other quality-related measures obtained via small sample testing performed at time of load receiving. A new upper boundary surface topographic map is then associated with the last incoming load using the method of FIGS. 2, 3, 4, 8 and 9, for example. The total volume of the incoming loads is calculated in each destination container by computing the vertical difference between the last two (2) surface topographic maps and then computing the intervening volume: these two maps are the map recorded after the arrival of the last incoming load and the last map of the container contents recorded prior to the arrival of the incoming loads. If the container was initially empty, then the total incoming multi-load volume is calculated by computing the difference between the map associated with the last incoming load and the map of the container's interior surface. The position of the incoming loads is located relative to previously stored loads, if any, within each destination container by identifying as the lower and upper boundaries the locations of the two (2) bounding surface topographic maps recorded immediately prior to and immediately following transfer of the loads into the container. The relative location of these bounding surfaces remains nearly constant as additional loads are successively stacked on previous loads. The next step is to locate the sequential position of each load that is part of the batch of incoming loads bound by the lower and upper maps by referencing the tabulated records. Using the stacking characteristics of the container in conjunction with the known material properties of each individual load (primarily density and material type) to calculate and build virtual boundaries between the unmapped loads. The position of each unmapped load is located using these virtual boundaries as described above with respect to identifying the lower and upper boundaries of added material. Essential load-specific parameters are associated with each located load within a container including, for example, the load's upper and lower boundary maps, time and date, material type, weight, density, moisture content and/or other quality-related measures obtained via small sample testing performed at time of load receiving. Resulting boundary maps, virtual load boundaries and associated information are then stored in a strata catalogue for later recall and manipulation. The load configuration and multi-load strata assemblage may then be reported on demand by convenient graphical display or reporting methods based on all data associated with each load stored in a particular container. Display and reporting may be accomplished via manual, semi-automated or fully-automated processes.

Referring again to FIG. 14, step A in the process and cross sectional views represent the beginning of the method which is to establish a first contour mapping event for an existing bulk material surface 1401 and catalog that data. Step B in the process and cross sectional views represent the addition of multiple loads 1402 of differing content that will each be loaded into the same storage container. The load/sample data for each load is catalogued in the database according to the order in which they were added to the container. Step C in the process and cross sectional views represents that bulk material has been added to the storage container and at this point a contour mapping event of the upper surface of the material 1403 is generated and the data from this mapping is catalogued to the database. Of particular note is that to maintain strata accuracy, the storage container is mapped between every add (or multi-add)/withdrawal (or multi-withdrawal) cycle (i.e. operator must add bulk, then map before withdrawing, then withdrawal, then repeat map, etc.). Step D in the process and cross sectional view represents the load differentiation, volume calculation, and source location as it would be shown as part of a display output 1404. Additional detail regarding step D may include: a.) compare the heights between contour maps which provides the total height change of the bulk added. b.) Reference the tabulated logged data for arrival number and origination source of loads added which provides the sequential listing of the order of the loads added. c.) Reference the tabulated logged data of each load to use: total weight/mass/volume of load, sample data such as density, percent foreign material, etc., calculate the compression on the load position due to overburden weight, combine all such information to determine the thickness of each load layer. d.) Adjust the layer thickness and positions for precision (e.g., angle of repose influence on sliding layers, filler positions, etc.). The items in box 1405 represent the overall flow chart logic of the inbound load element of the method of this embodiment.

Referring now to the flow diagram of FIG. 15, the operational steps of bulk material load source identification and properties data-tagging, as shown in steps A, B, C and D of FIG. 14 are described for an embodiment. This embodiment allows multiple inbound loads to arrive and be deposited in one or more containers without the need for an intervening surface map collection procedure between each load addition operation in each container. This may hold an advantage for a bulk material handling site's throughput, since fewer operational pauses are required to collect the surface maps necessary to accurately locate individual loads inside the containers. In step A, a pre-addition surface map is confirmed for the preexisting material in the container along with associated source information and bulk property data. Step B begins when a new bulk material load is added to the container and the load's associated source identifier and bulk properties are catalogued on the site computer. Successive loads may be added with the load-in sequence and each load's source and bulk property data catalogued by the site computer. In step C, a surface map of the resulting total inventory is collected and this information is also catalogued with the incoming load data. The geometric differencing and volumetric determination of the total inflow resulting from the multiple added loads are performed using the pre-add and post-add surface maps. In step D, the properties of each individual load, catalogued in the site computer upon arrival of the load, are used by a software algorithm that computes angle of repose and compaction for each load. This information is used to assign virtual boundaries for each load and then the loads are located via data tagging within the container and logical links are created between those layers and their associated source and bulk properties data. As mentioned, one advantage of this procedure is that it eliminates the need to perform surface mapping between each load input to the container. Any number of additions can be performed prior to post-add surface map collection, as long as no withdrawals are performed, and by using the method of this embodiment, the individual loads will be traceable.

Figure 16:
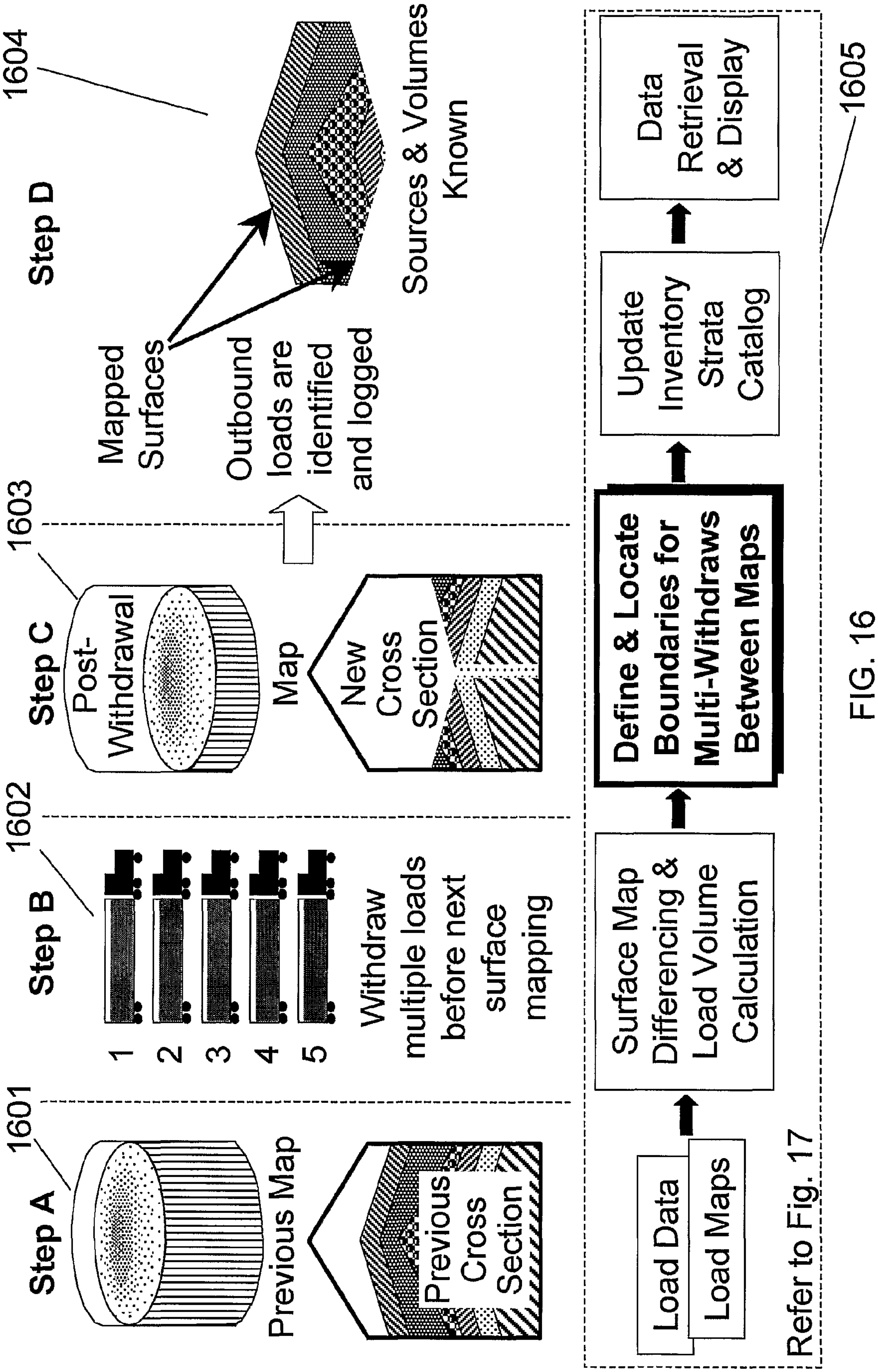
FIG. 16 contains cross sectional illustrations of outbound multiple loads that are sporadically mapped for surface map differencing and strata logging source location of an embodiment.
Figure 17:
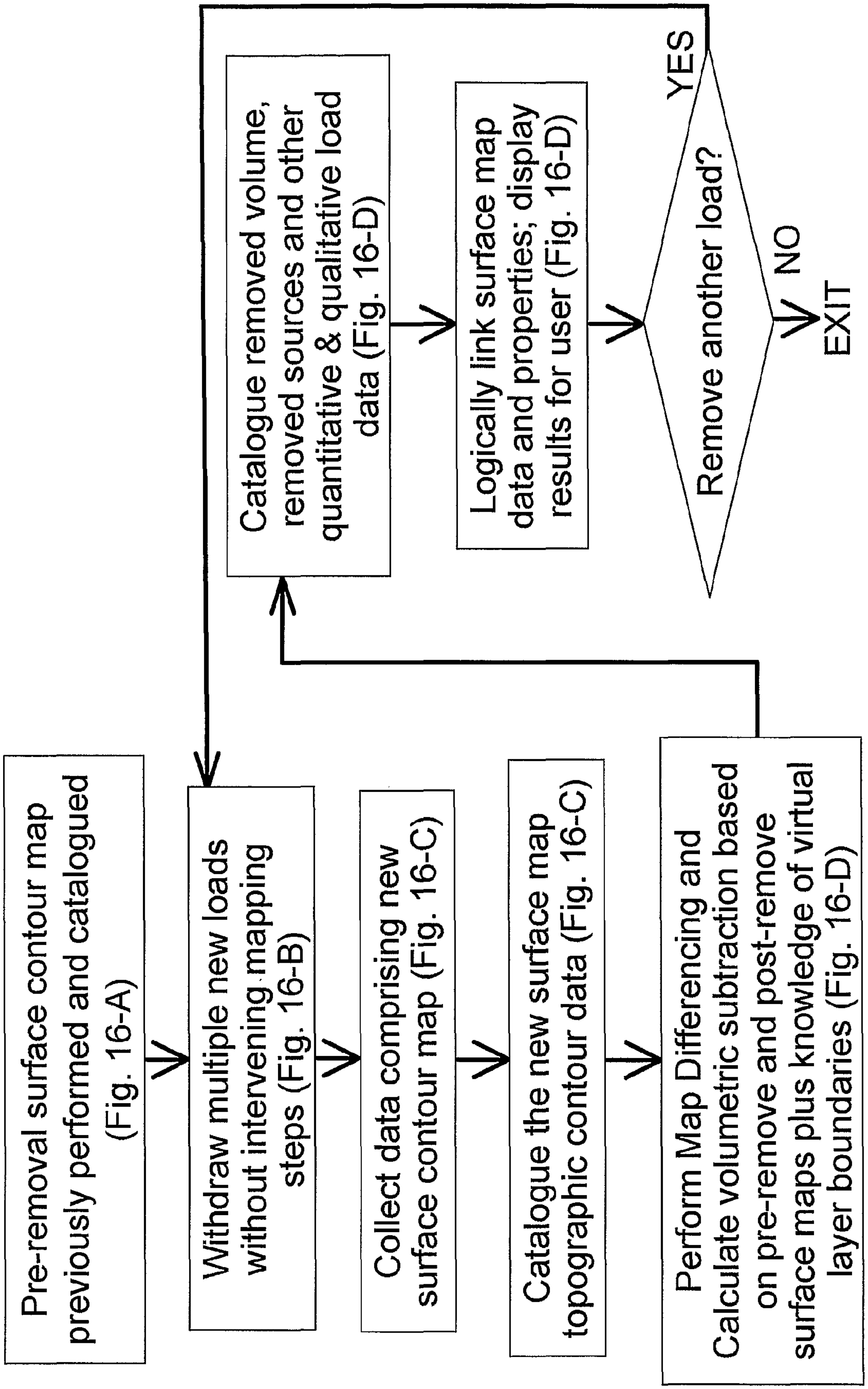
FIG. 17 is a flow chart illustrating the operational steps for the embodiment of FIG. 16.

Referring now to FIGS. 16 and 17, another embodiment of the invention is described. In this embodiment, multiple loads are withdrawn from the storage container. Initially, all individual arriving loads are traced by recording and manipulating information on production origins, volume and weight, transportation mode, storage containers and material strata locations within each container at a facility using, for example, the embodiments of FIGS. 2, 3, 4, 8 and 9 (single loads between consecutive surface maps) and FIGS. 14, 15 (multiple loads between consecutive surface maps). Prior to any material withdrawal, a surface map is collected after completion of the immediately preceding one or more consecutive additions. The strata catalogue is updated to account for any addition of material to the container (as in FIG. 8). Next, all individual departing loads are traced by recording and manipulating information on production origins, volume and weight, transportation mode, source storage containers and material strata locations within each container at the facility, such as by using the embodiments of FIGS. 5-9. The next step is to calculate and store the source-specific fractional content of the outgoing load and update the strata catalogue to account for the withdrawal of material from the container (as in FIG. 8).

Referring now to FIG. 16, step A in the process and cross sectional views represent the beginning of the method of this embodiment, which is two-fold. First, that the last load-in occurs and second, to command a contour mapping event to map the material surface 1601 and catalog the resulting data. This can be in direct sequence with the previous inbound process shown, for example, by FIG. 2-4 or FIG. 14-15. Step B in the process and cross sectional views represent the withdrawal of multiple loads 1602 from the same storage container. Step C in the process and cross sectional views represent that bulk material has been withdrawn from the storage container and at this point a contour mapping event is required to map the material surface 1603 and the data from this mapping is catalogued into the database. Step D in the process and cross sectional view represent the load differentiation, volume calculation, and source identification of loads that were loaded out. It also represents the element of the method where due to the order/chronological sequence of the loads removed, source/ingredient tagging of the contents of each load is made possible, with a graphical representation illustrated at 1604. The items in box 1605 represent the overall flow chart logic of the outbound load element of the method of this embodiment.

Referring now to the flow diagram of FIG. 17, the operational steps of bulk material load source identification and properties data-tagging, as shown in steps A, B, C and D of FIG. 16 are described for an embodiment. This embodiment allows multiple outbound loads to be withdrawn from one or more containers without the need for an intervening surface map collection procedure between each load removal operation in each container. This may hold an advantage for a bulk material handling site's throughput, since fewer operational pauses are required to collect the surface maps necessary to accurately determine the fraction of each load remaining in each of the containers. In step A, a pre-removal surface map is confirmed for the preexisting material in the container along with locations of all the data-tagged layers and associated source information and bulk property data. Step B begins when a bulk material load is removed from the container. Multiple loads may be removed and the sequence is recorded. Step C starts with a surface map of the resulting total inventory that is catalogued and associated with each of the outbound loads via the site computer. Step D features the geometric differencing and volumetric determination of the total outflow resulting from the multiple removed loads and are performed using the pre-removal and post-removal surface maps. This information is used by a software algorithm to accurately locate the layers/loads removed during the multiple load-outs and assign fractional layer contents to each outbound load. This process establishes virtual load-out boundaries as if surface maps had been collected between each load removal operation. Based on the sequencing of the original load additions and then subsequent load removals, knowledge of the fractional layer contributions, source identification and bulk properties are accurately assigned to each outbound load as well, with all information being catalogued by the site computer. As mentioned above, one advantage of this procedure is that it eliminates the need to perform surface mapping between each load removal from the container. Any number of withdrawals can be performed prior to post-removal surface map collection, as long as no additions are performed, and by using this embodiment, all components of the individual loads will be traceable.

Figure 18:
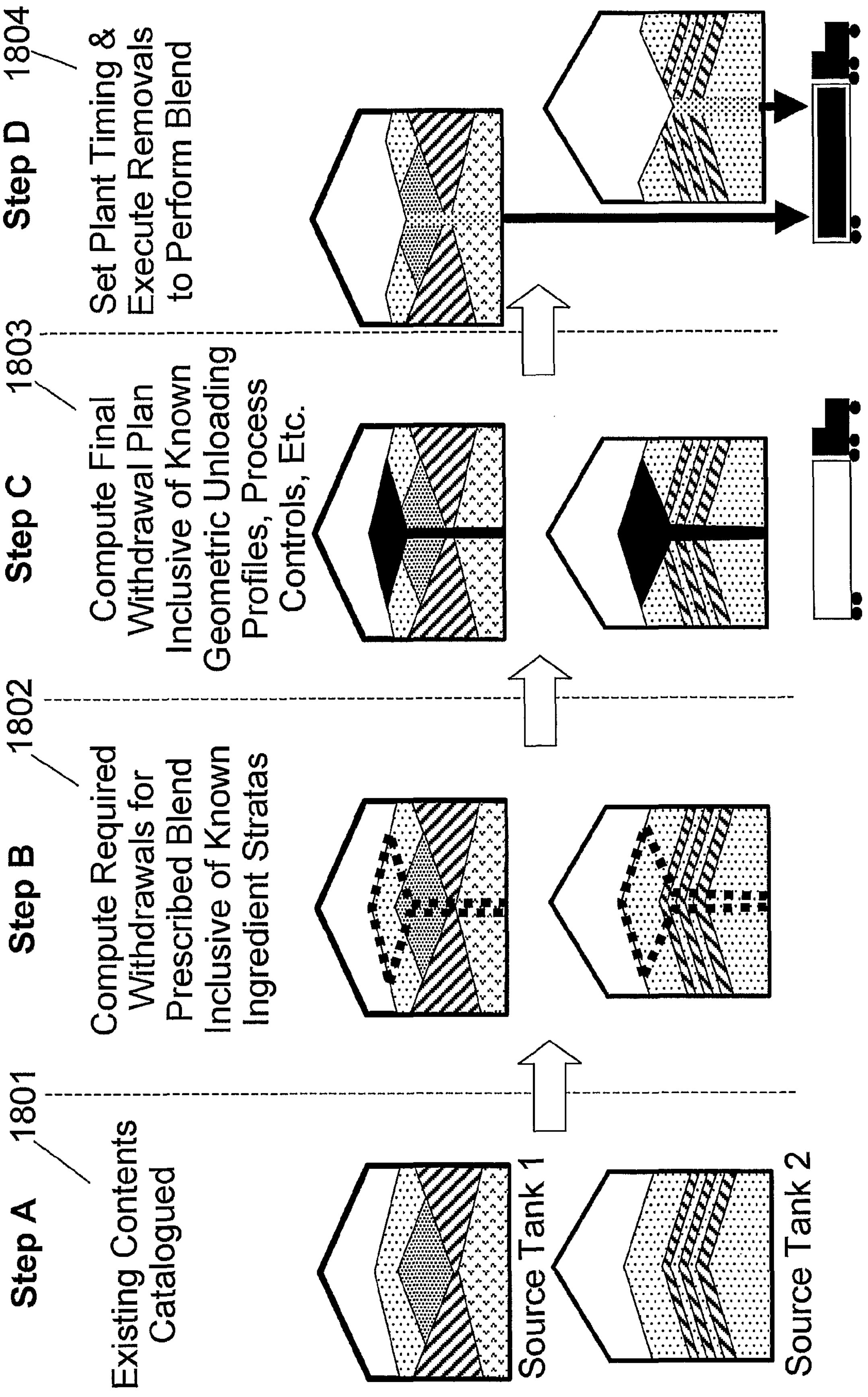
FIG. 18 contains cross sectional illustrations of preplanning and optimizing blended batches from one or more containers based on surface map differencing and strata logging source location of an embodiment.
Figure 19:
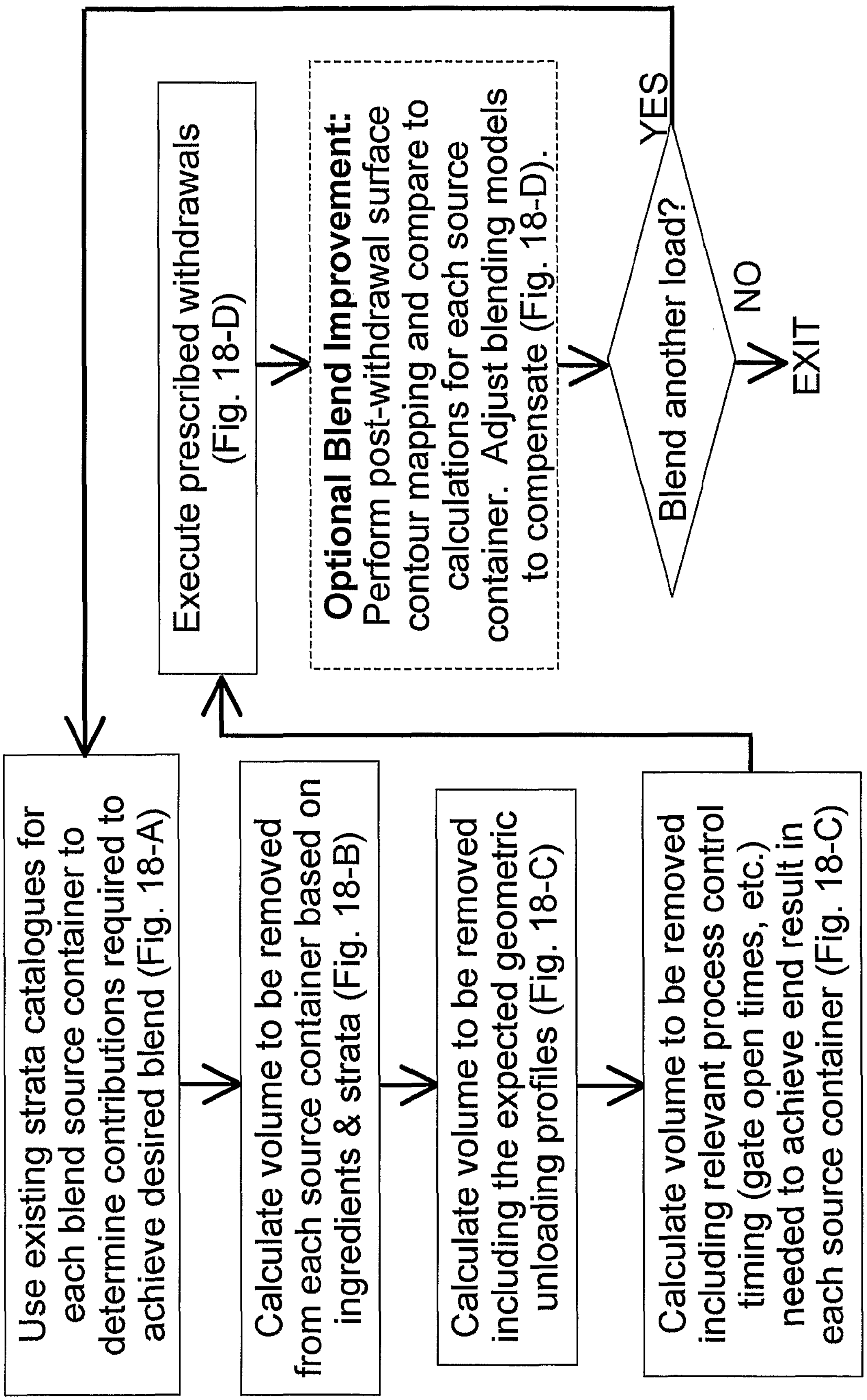
FIG. 19 is a flow chart illustrating the operational steps for the embodiment of FIG. 18.

Referring now to FIGS. 18 and 19, another embodiment of the present invention is described. In this embodiment, material from one or more storage containers is blended to create a resultant mixture of materials that has a predefined specification for one or more properties of the material. In this embodiment, for each storage container, a database is maintained that has saved all the sequential mapping and sequential load-in source information described in the previous traceability embodiments. In addition, the same database contains the description of the characteristic geometric cone shape or cone shape derivative that forms when the container's contents are unloaded or withdrawn from the container bottom or sidewall. The database holds parameters that govern modifications to the standard withdrawal cone shape including the specific angle of repose of each source layer, the cone shape history for each specific storage container, any special unloading conditions (e.g., multiple bottom gates vs. the standard single center unloading gate), each container's tendency to load out via plug flow or funnel flow, and other variables. A user then sets the desired specifications of the blended batch of bulk material including, but not limited to total weight or volume, percent protein, percent damage, test weight and/or density. A software algorithm uses these inputs in conjunction with knowledge of each container's contents and base load-out characteristics to determine the amount of material needed from each container to meet the user's target blend specification. The software algorithm of this embodiment possesses utilities that allow modifications to each container's primary load-out characteristic based on the bulk properties of each load stored inside it, modifying the load-out cone shape; this refines the blend calculation procedure. The software informs the user regarding which containers bulk material must be removed from and what rates of removal and elapsed removal times must be used to ensure the target blend specification is met for a given output volume or weight of material. The software may alternatively inform the user of the total weight or volume that must be removed from each container to create the correct blend in the final volume or weight.

With reference now to FIG. 18, step A and cross sectional drawings of the blending optimization feature of the method of this embodiment represent that a preexisting database 1801 of catalogue conditions (location and contents strata) exists. Step B and cross sectional drawings illustrate that: 1. a load of bulk is required for load-out. 2. a blend specification is known for this load-out including the required quantity of material and required ingredient contents. 3. the candidate containers to be used as potential sources are determined. 4. those containers have present catalogued conditions in the database 1801. 5. computations are performed factoring the preceding items. 6. the computations prescribe the container or containers to use and approximate quantities to withdraw in order to meet the load-out specification 1802. Step C and cross sectional drawings illustrate an important accuracy element of the blending optimization feature of this embodiment whereby further computations 1803 are performed that account for dynamic effects that influence achievement of the final blend specification. These dynamic effects can include: known and/or predicted unloading geometry, process controls (such as number of gates to be used), differing ingredient effects on the unloading flow (such as differing percentage of foreign material in the layers), for example. Upon completion of these computations, the unloading batch plan is finalized. The method provides the operator a batch plan which includes such items as: 1. the container or containers to utilize for unloading, 2. the quantity to remove from each container, 3. the rate of withdrawal to set for each container (if the unloading rate capability of the container(s) is known), and 4. other relevant information. Step D and cross sectional drawings illustrate the final step of the blending optimization feature where the operator then sets all of the plant controls, gates, etc. and conducts the load-out blend 1804 until it is complete. By preplanning the blended output load based on accurate knowledge of available contributions to the outbound load, the operator will see marked improvements in the efficiency of meeting blend specifications over existing methods which commonly involve estimating what will contribute to the load based on the average content of containers.

Referring now to the flow diagram of FIG. 19, the general process steps required to implement blend planning and control optimization shown through steps A, B, C and D of FIG. 18 are described for an embodiment. In step A, existing strata catalogues for each blend source container are used to determine the containers from which contributions must be withdrawn to achieve a desired output blend specification. Step B involves performing the calculations necessary to estimate the total load-out weight and strata content required from each contributing container to meet the target blend specification. In step C, the geometric parameters of the required load-out for each contributing container are calculated and critical plant operational parameters (gate choice, gate open time, etc.) are specified to achieve the desired target geometries and flow rates. With step D comes execution of the blend operation according to the planned plant operational settings. An optional post-blend operation calls for collection of surface map information in each contributing container in order to confirm the accuracy of parameter-based load-out geometry predictions and, if needed, modify the load-out geometric models accordingly. A final decision box in the diagram shows that following completion of the blend operation, the operator may elect to perform another blend by returning to step A or exit the blend procedure.

Figure 20:
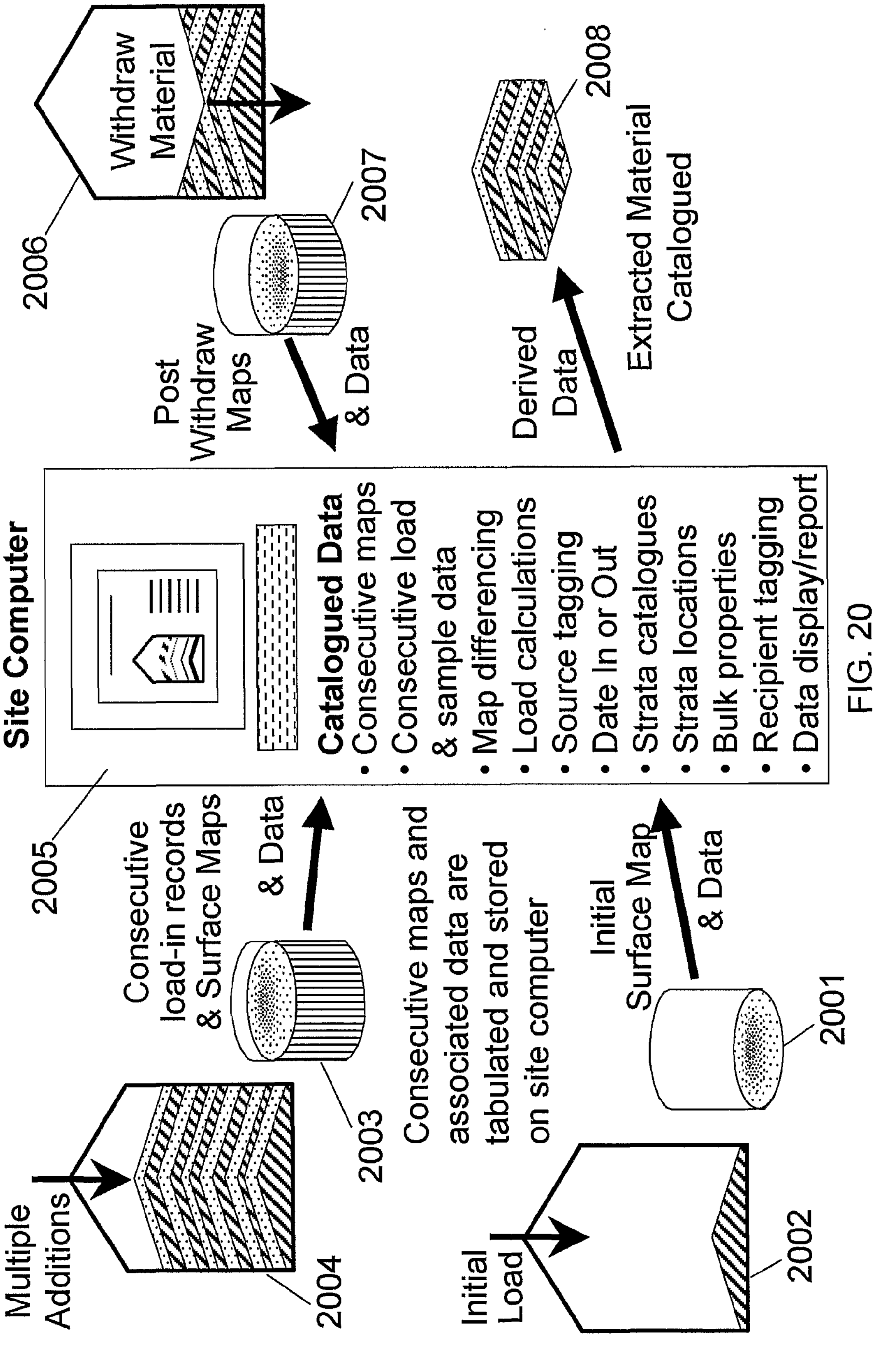
FIG. 20 is a block diagram illustration of a computing system of an embodiment.

Referring now to FIG. 20, a computer system for implementing one or more the above described features at a single facility site (intra-site) is described for an embodiment. The data sources (load/sample, mapping) are gathered and catalogued, and further processed in sequential order and re-catalogued to the database where it is available to the on-site operators in display or report format. Those information formats include such items as: consecutive maps, consecutive load and origination and sample data, strata catalogues, source location catalogues, source/volume withdrawal histories, blend histories, immediate previous source and immediate subsequent recipients for tracing investigations.

An initial load 2001 of non-liquid bulk material arrives in a storage container. Surface map information 2002 for the initial material load is created and is included as part of the information associated with the first load of the container's most recent fill-empty cycle. Subsequent sets of surface map information 2003 are created and are associated with subsequent loads added to the container. As illustrated by the cross section 2004, an arbitrary number of subsequent loads of material arrive in the storage container, and may be arranged within the container as illustrated. This detailed geometric knowledge of the arrangement of layers is possible using methods described herein. A computer 2005 is located at the site, plant or facility where the storage container is managed. This computer is where all data associated with incoming and outgoing loads of material at this container are accumulated and organized to produce any or all of the information described herein. A single computer may be dedicated to the management of load information for one or more storage containers. The actual arrangement of material layers following a withdrawal of an arbitrary amount of the material originally stored in the container is illustrated in cross section 2006. Such detailed geometric knowledge of the arrangement of layers is possible only via the methods described herein. Surface map information 2007 collected with following the withdrawal of material from the container are provided to the computer 2005. The results obtained from computer software operations performed using the post-withdrawal and pre-withdrawal surface map information in conjunction with the material bulk properties of the stored loads and the container's load-out characteristics are illustrated at 2008. A map difference is performed that accurately describes the material withdrawn in terms of the fractions of existing layers that were withdrawn, all associated identification data including material source identification, as well as the resulting average bulk properties of the withdrawn load based on accurately weighted ratios of the bulk properties of the individual layers removed. All resulting information is catalogued by the site storage management computer 2005.

Figure 21:
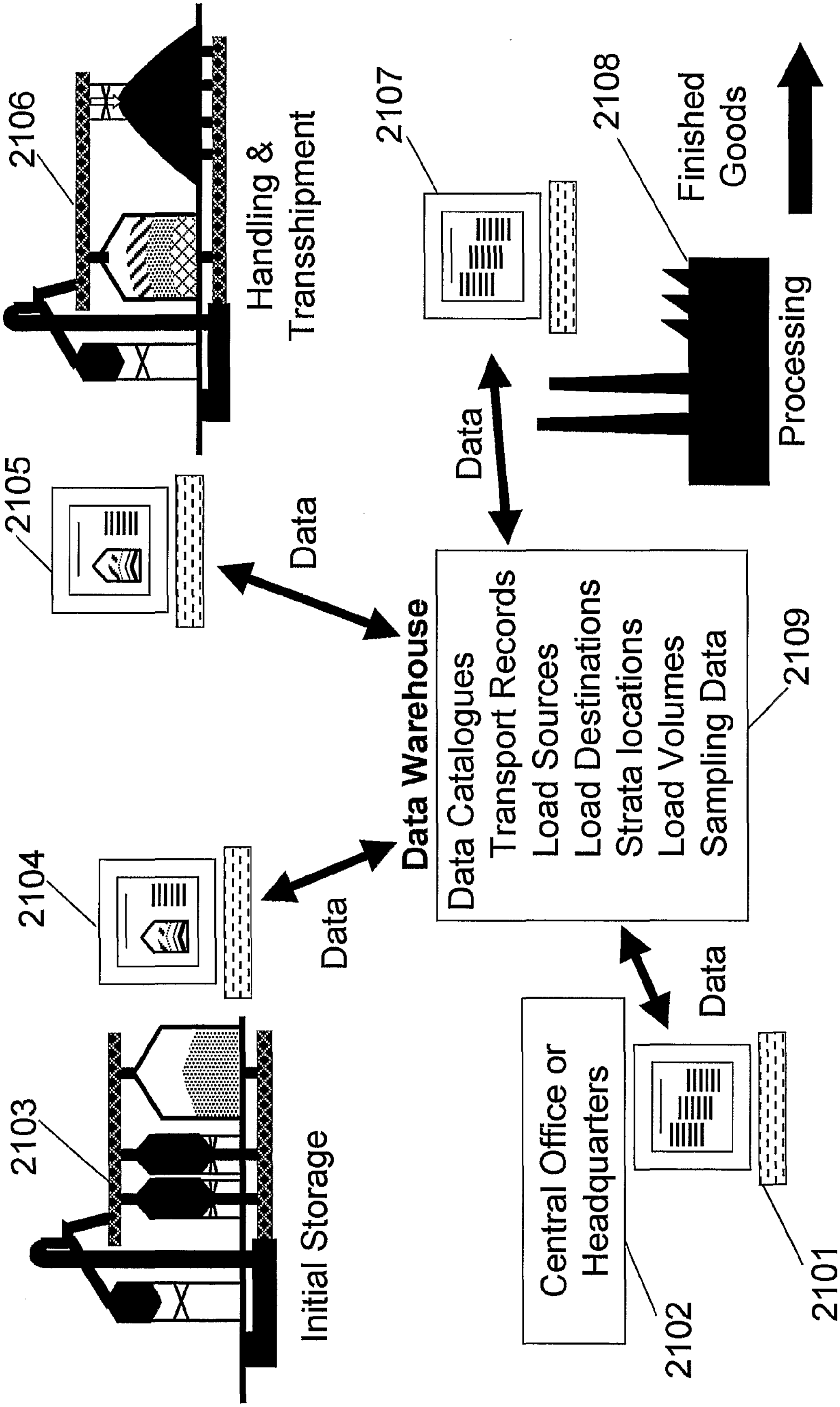
FIG. 21 is a block diagram illustration of a networked system with central data center that collects data and provides information to different sites for an embodiment.

Referring now to FIG. 21, a data warehousing system for performing the method described in this invention on multiple sites (inter-site) and for centrally storing the data is illustrated for an embodiment. In this embodiment, data is transmitted to and from the warehouse, such as by any available data transmission medium such as modem, satellite, and/or intranet, to name but a few. Such a system may also provide a central location for the inter-site tracing described with respect to FIGS. 12 and 13.

In this embodiment, a networked information processing system featuring a central data center or data warehouse is provided that collects data from and provides data to multiple bulk material storage, handling, and processing sites as well as interfacing with central inventory management computers. A computer 2101 that resides at a central office or headquarters facility is used to coordinate the accumulation, use and dissemination of inventory operations and traceability information among one or more bulk material handling, storage and/or processing plants. This computer 2101 comprises a node in an ordinary closed or open network of computers. A central office or headquarters location of a corporate or other commercial or governmental entity 2102 may be a separate location or may be co-located with a bulk material handling, storage and/or processing operation. A handling, storage and/or processing site 2103 is where bulk materials first enter the inventory control system of a corporate or other commercial or governmental entity. A site computer 2104 is responsible for the storage and manipulation of inventory information for all containers managed by this initial inventory entry location 2103. This computer 2104 is where all data associated with incoming and outgoing loads of material for all containers at this site are accumulated and organized using data management methods. Computer 2104 may be a single computer dedicated to the management of load information for one or more storage containers. This computer 2104 also comprises a node in an ordinary closed or open network of computers. A site computer 2105 is responsible for the storage and manipulation of inventory information for all containers managed at a different bulk material handling, storage and transshipment site 2106. This computer 2105 is where all data associated with incoming and outgoing loads of material for all containers at site 2106 are accumulated and organized using data management methods. Computer 2104 may be a single computer dedicated to the management of load information for one or more storage containers, and also comprises a node in an ordinary closed or open network of computers. Handling, storage and transshipment site 2106 may be an intermediate facility where bulk materials are temporarily held, merged with other loads and/or passed on to other facilities within the bulk material inventory control system of a corporate or other commercial or governmental entity, or passed on to some other outside entity. A site computer 2107 is responsible for the storage and manipulation of inventory information for all containers managed at a bulk material processing or endpoint handling site 2108. This computer 2107 is where all data associated with incoming and outgoing loads of material for all containers at site 2108 are accumulated and organized using data management methods. Computer 2107 may be a single computer dedicated to the management of load information for one or more storage containers, and also comprises a node in an ordinary closed or open network of computers. The processing or endpoint handling site 2108 may be a facility where bulk materials are temporarily held and are then either processed into finished goods, or passed on to some other outside entity. Site 2108 marks the exit point for materials within the bulk material inventory control system of a corporate or other commercial or governmental entity. A data warehouse 2109 that comprises one or more computers has the responsibility for cataloging all bulk material inventory transaction information generated by any number of individual site inventory management computers comprising each node on an open or closed network of computers. The data warehouse node does not have to be a controlling central node as depicted, but could be part of a generic network architecture that features any number of levels of mutual access among all participating nodes.

While the invention has been particularly shown and described with reference to various embodiments thereof, it will be readily understood by those skilled in the art that various other changes in the form and details may be made without departing from the spirit and scope of the invention.

What is claimed is:

1. A method for determining the location of each of multiple loads of commingled non-liquid bulk material in a storage container comprising:

obtaining a first surface map of an upper surface of existing bulk material stored in a bulk material storage container;

recording properties and identification information associated with loads of bulk material added to said bulk material storage container, including at least a first load of bulk material added to said bulk material storage container;

obtaining a second surface map of said upper surface of bulk material stored in said bulk material storage container, said second surface map obtained after said first surface map and after at least said first load of bulk material is added to said bulk material storage container; and arranging said properties and identification information to indicate actual sequential layering of each of said loads of bulk material added to said bulk material storage container.

2. The method of claim 1, further comprising:

determining a volume of at least said first load within said bulk material storage container based on a difference between said first surface map and said second surface map, and based on said properties and identification of said loads of bulk material added to said bulk material storage container.

3. The method of claim 1, further comprising:

recording properties and identification information associated with a second load of bulk material added to said bulk material storage container, said second load added after said first load; and wherein said second surface map is obtained after said second load of bulk material is added to said bulk material storage container.

4. The method of claim 3, further comprising:

determining a volume of each of said first and second loads within said bulk material storage container based on a difference between said first surface map and said second surface map, and based on said properties and identification of said loads of bulk material added to said bulk material storage container.

5. The method of claim 1, further comprising:

obtaining a third surface map of said upper surface of bulk material stored in said bulk material storage container, said third surface map obtained after a first withdrawal of bulk material from said bulk material storage container;

comparing said third surface map to said second surface map;

determining portions of said loads of bulk material remaining at said bulk material storage container after said first withdrawal based on said previously determined sequential layering of said loads, said properties and identification information of said loads, and said step of comparing; and determining a volume of material withdrawn from said bulk material storage container based on said second and third surface maps, and determining a volume of material withdrawn that is associated with each of said loads based on said previously determined sequential layering of said loads, said properties and identification information of said loads, and said step of comparing.

6. The method of claim 1, wherein said step of recording comprises recording a source associated with said first load of bulk material and recording measured properties that characterize the bulk material, said properties including at least one of: bulk type, species, water content, protein content, foreign material content, defect content and impurity content.

7. The method of claim 1 wherein said step of recording properties and identifying information further comprises:

processing said properties and identifying information to provide a record of sources associated with all incoming bulk material loads handled through said bulk material storage container.

8. The method of claim 7, further comprising:

exchanging said records of source and said properties and identifying information associated with each bulk material load with at least one other bulk material storage facility that received at least a portion of bulk material withdrawn from said bulk material storage container; and tracing bulk material sources associated with all loads that are stored at said bulk material storage facilities.

9. The method of claim 8, wherein said bulk material storage containers include all bulk material storage containers located at one or more transshipment facilities owned by a corporation and/or all bulk material storage and transshipment facilities monitored by a government regulatory agency.

10. The method of claim 4, further comprising:

determining, based on said properties and identifying information and bulk material withdrawal geometric characteristics for said bulk material storage container, required input volumes of bulk material needed from one or more separate bulk material storage containers to achieve an arbitrary output load composition that meets a predefined blend specification based on blending parameters that are used to blend the input from said one or more separate bulk material storage containers.

11. The method of claim 10, wherein said bulk material storage containers are located at a bulk material facility, and further comprising:

coordinating with other bulk material storage facilities to trace all bulk material sources and recipients as all loads, blended or unblended, are stored and moved across an arbitrary number of such facilities.

12. The method of claim 11, wherein said bulk material storage facilities include all bulk material storage, transshipment and processing facilities operated by a corporation and/or monitored by a government regulatory agency.

13. A method for determining the source(s) of each of multiple loads of commingled non-liquid bulk material withdrawn from a storage container comprising:

obtaining a first surface map of an upper surface of bulk material stored in a bulk material storage container;

obtaining stored load information associated with stored loads of bulk material stored at said bulk material storage container, said load information including properties and identification information for said stored loads and sequential layering information of said stored loads;

obtaining a second surface map of said upper surface of bulk material stored in said bulk material storage container, said second surface map obtained after said first surface map and after a first load of bulk material is withdrawn from said bulk material storage container; and identifying, based on said stored load information, identification information for each stored load that comprises at least a portion of said first load.

14. The method of claim 13, further comprising:

determining a volume within said bulk material storage container of each of said stored loads; and determining, for each stored load identified in said step of identifying, a volume of said stored load contained in said first load.

15. The method of claim 13, further comprising:

recording properties and identification information associated with at least a second load of bulk material added to said bulk material storage container, said second load added after said first load is withdrawn;

obtaining a third surface map of said upper surface of bulk material stored in said bulk material storage container, said third surface map obtained after said second load of bulk material is added to bulk material storage container; and arranging said properties and identification information to indicate actual sequential layering of said second load and any stored loads of bulk material remaining after said first load is withdrawn.

16. The method of claim 13, wherein said properties characterize the bulk material, said properties including at least one of: bulk type, species, water content, protein content, foreign material content, defect content and impurity content.

17. The method of claim 16, further comprising:

exchanging said records of source and said properties and identifying information associated with each bulk material load with at least one other bulk material storage facility; and tracing bulk material sources associated with all loads that are stored at said bulk material storage facilities.

18. The method of claim 17, wherein said bulk material storage containers include all bulk material storage containers located at one or more bulk material storage and transshipment facilities owned by a corporation and/or all bulk material storage and transshipment facilities monitored by a government regulatory agency.

19. The method of claim 15, further comprising:

determining, based on said load information and bulk material withdrawal geometric characteristics for said bulk material storage container, required input volumes of bulk material needed from one or more separate bulk material storage containers to achieve an arbitrary output load composition that meets a predefined blend specification based on blending parameters that are used to blend the input from said one or more separate bulk material storage containers.

20. A system for locating and tracking loads of commingled non-liquid bulk material added to and withdrawn from one or more bulk material storage container(s), comprising:

a mapping unit operable to receive surface data indicative of a surface of bulk material stored at one or more bulk material storage container(s);

a database operable to store properties and identification information associated with loads of bulk material added to and removed from said bulk material storage container(s) and operable to store a sequence in which said loads were added and removed; and a processor operable to determine a location of one or more loads of bulk material within at least a first bulk material storage container based on said surface data, said sequence information, and said properties and identification of said loads of bulk material stored at said first bulk material storage container.

21. The system of claim 20, wherein said mapping unit, database, and processor are operably interconnected to a plurality of bulk material storage containers through a network, and wherein:

said mapping unit is operable to receive surface data from each of said plurality of bulk material storage containers;

said database is operable to receive properties and identification information associated with each load of bulk material added to and removed from each of said bulk material storage containers; and wherein said processor is operable to determine sequential layering and layer removal that results from successive load additions and removals from each of said bulk material storage containers.

22. The system of claim 21, wherein said processor is further operable to trace all bulk material sources and recipients as all loads are stored and moved across an arbitrary number of bulk material storage containers, including bulk material storage and transshipment facilities operated by a corporation and/or monitored by a government regulatory agency.

23. The system of claim 20, wherein said processor is further operable to determine required input volumes of bulk material needed from one or more separate bulk material storage containers and to calculate required removal rate for material removal and a duration for removal at the required removal rate for each bulk material storage container, to achieve an output load composition that meets a predefined blend specification based on blending parameters that are used to blend the input from said one or more separate bulk material storage containers.

24. The system of claim 20, further comprising:

a plurality of bulk material storage and transshipment facilities, each of said facilities comprising said mapping unit, said database, and said processor; and a data warehouse in communication with each of said plurality of facilities comprising:

a database operable to store properties and identification information associated with loads of bulk material added to and removed from bulk material storage containers at one or more of said facilities, and operable to store sequential layering information for material stored in said storage containers; and a processor operable to determine a location of one or more loads of bulk material within said bulk material storage containers at one or more of said facilities based on said sequential layering information, said properties and identification of said loads of bulk material stored, and transport information associated with bulk material transported between two or more of said facilities.

* * * * *